(12) United States Patent
Nammi

(10) Patent No.: US 10,484,072 B1
(45) Date of Patent: Nov. 19, 2019

(54) DETERMINING CHANNEL STATE INFORMATION IN 5G WIRELESS COMMUNICATION SYSTEMS WITH PHASE TRACKING

(71) Applicant: AT&T Intellectual Property I, L.P., Atlanta, GA (US)

(72) Inventor: SaiRamesh Nammi, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 16/145,523

(22) Filed: Sep. 28, 2018

(51) Int. Cl.
| | |
|---|---|
| *H04B 7/0413* | (2017.01) |
| *H04B 7/06* | (2006.01) |
| *H04W 72/12* | (2009.01) |
| *H04B 7/01* | (2006.01) |
| *H04B 7/0456* | (2017.01) |
| *H04B 7/08* | (2006.01) |

(52) U.S. Cl.
CPC ............. *H04B 7/0632* (2013.01); *H04B 7/01* (2013.01); *H04B 7/0486* (2013.01); *H04B 7/063* (2013.01); *H04B 7/0822* (2013.01); *H04W 72/1273* (2013.01)

(58) Field of Classification Search
CPC .. H04B 7/0632; H04B 7/0822; H04B 7/0486; H04B 7/063; H04B 7/01; H04W 72/1273
See application file for complete search history.

(56) References Cited

U.S. PATENT DOCUMENTS

| | | | |
|---|---|---|---|
| 9,960,829 B2 | 5/2018 | Wu et al. | |
| 10,090,980 B2 | 10/2018 | Nammi et al. | |
| 2008/0273495 A1* | 11/2008 | Becker | H04W 36/0088 370/331 |
| 2014/0185662 A1* | 7/2014 | Azizi | H04L 27/2647 375/232 |
| 2015/0036631 A1* | 2/2015 | Yang | H04W 72/0446 370/329 |
| 2018/0091350 A1 | 3/2018 | Akkarakaran et al. | |
| 2018/0124796 A1 | 5/2018 | Noh et al. | |
| 2018/0205480 A1 | 7/2018 | Akkarakaran et al. | |
| 2018/0205528 A1 | 7/2018 | Bai et al. | |
| 2018/0205589 A1 | 7/2018 | Bai et al. | |

(Continued)

FOREIGN PATENT DOCUMENTS

| | | |
|---|---|---|
| WO | 2018120875 A1 | 7/2018 |
| WO | 2018143405 A1 | 8/2018 |

*Primary Examiner* — Dac V Ha
(74) *Attorney, Agent, or Firm* — Amin, Turocy & Watson, LLP

(57) ABSTRACT

The disclosed subject matter relates to techniques for determining channel state information (CSI) in New Radio (NR) access communication systems with phase tracking. In one embodiment, a method is provided that comprises receiving, by a device comprising a processer, configuration information from a network device of a wireless communication network indicating that a PTRS protocol has been configured for wireless communications between the device and the network device. The method further comprises, determining, by the device, a resource density of resource elements of the wireless communication network allocated for the phase tracking reference signal protocol, determining, by the device, CSI based on the resource density, and reporting, by the device, the CSI to the network device.

20 Claims, 13 Drawing Sheets

(56) References Cited

U.S. PATENT DOCUMENTS

| | | |
|---|---|---|
| 2018/0227929 A1 | 8/2018 | Yoo et al. |
| 2018/0234959 A1 | 8/2018 | Ahn et al. |
| 2018/0287739 A1 | 10/2018 | Kim et al. |
| 2018/0287759 A1 | 10/2018 | Kundargi et al. |
| 2018/0288755 A1 | 10/2018 | Liu et al. |

\* cited by examiner

Time Density of PTRS as a Function of Scheduled MCS

| Scheduled MCS | Time density ($L_{PT-RS}$) |
|---|---|
| $I_{MCS} < \text{ptrs-MCS}_1$ | PT-RS is not present |
| $\text{ptrs-MCS1} \leq I_{MCS} < \text{ptrs-MCS2}$ | 4 |
| $\text{ptrs-MCS2} \leq I_{MCS} < \text{ptrs-MCS3}$ | 2 |
| $\text{ptrs-MCS3} \leq I_{MCS} < \text{ptrs-MCS4}$ | 1 |

FIG. 3

Frequency Density of PTRS as a Function of Scheduled Bandwidth

| Scheduled bandwidth | Frequency density ($K_{PT-RS}$) |
|---|---|
| $N_{RB} < N_{RB0}$ | PT-RS is not present |
| $N_{RB0} \leq N_{RB} < N_{RB1}$ | 2 |
| $N_{RB1} \leq N_{RB}$ | 4 |

FIG. 4

DETERMINING CHANNEL STATE INFORMATION IN 5G WIRELESS COMMUNICATION SYSTEMS WITH PHASE TRACKING

TECHNICAL FIELD

The disclosed subject matter relates wireless communication systems and more particularly, to techniques for determining channel state information in New Radio (NR) access communication systems with phase tracking.

BACKGROUND

To meet the huge demand for data centric applications, Third Generation Partnership Project (3GPP) systems and systems that employ one or more aspects of the specifications of the Fourth Generation (4G) standard for wireless communications are being extended to a Fifth Generation (5G) standard for wireless communications, also referred to as New Radio (NR) access. Compared to existing 4G technologies, 5G is targeting much higher throughput with low latency and utilizing higher carrier frequencies and wider bandwidths, at the same time reducing energy consumption and costs. 5G networks are also expected to offer system access and services that have different characteristics and connectivity control for future services. In this regard, the NR design needs to be highly flexible and tailored towards new requirements.

The foundation of this next generation cellular network is a global 5G standard for a new orthogonal frequency-division multiplexing (OFDM) based air interface designed to support the wide variation of 5G device-types, services, deployments and spectrum. The most apparent transformation taking place with 5G NR is the move towards higher millimeter wave (mmWave) frequencies, which provide a promising approach to significantly boost the capacity of 5G. However, mmWave devices and network access points suffer from severe phase noise mainly due to the mismatch of transmitter and receiver frequency oscillators. The standardized 3GPP Release introduced a reference signal referred to as the phase tracking reference signal (PTRS) to facilitate mitigating the performance loss due to phase noise. However, due to the new requirements and services of 5G NR, application of the 3GPP Release PTRS design specification to 5G NR wireless communication system has resulted in new challenges that must be overcome to achieve optimal system performance.

BRIEF DESCRIPTION OF DRAWINGS

FIG. 3 presents a table defining example time density PTRS values as a function of the scheduled modulation and coding schemes (MCS)s in accordance with various aspects and embodiments of the subject disclosure.

FIG. 4 presents a table defining example frequency density PTRS values as a function of the scheduled bandwidth in accordance with various aspects and embodiments of the subject disclosure.

DETAILED DESCRIPTION

Figure 1:
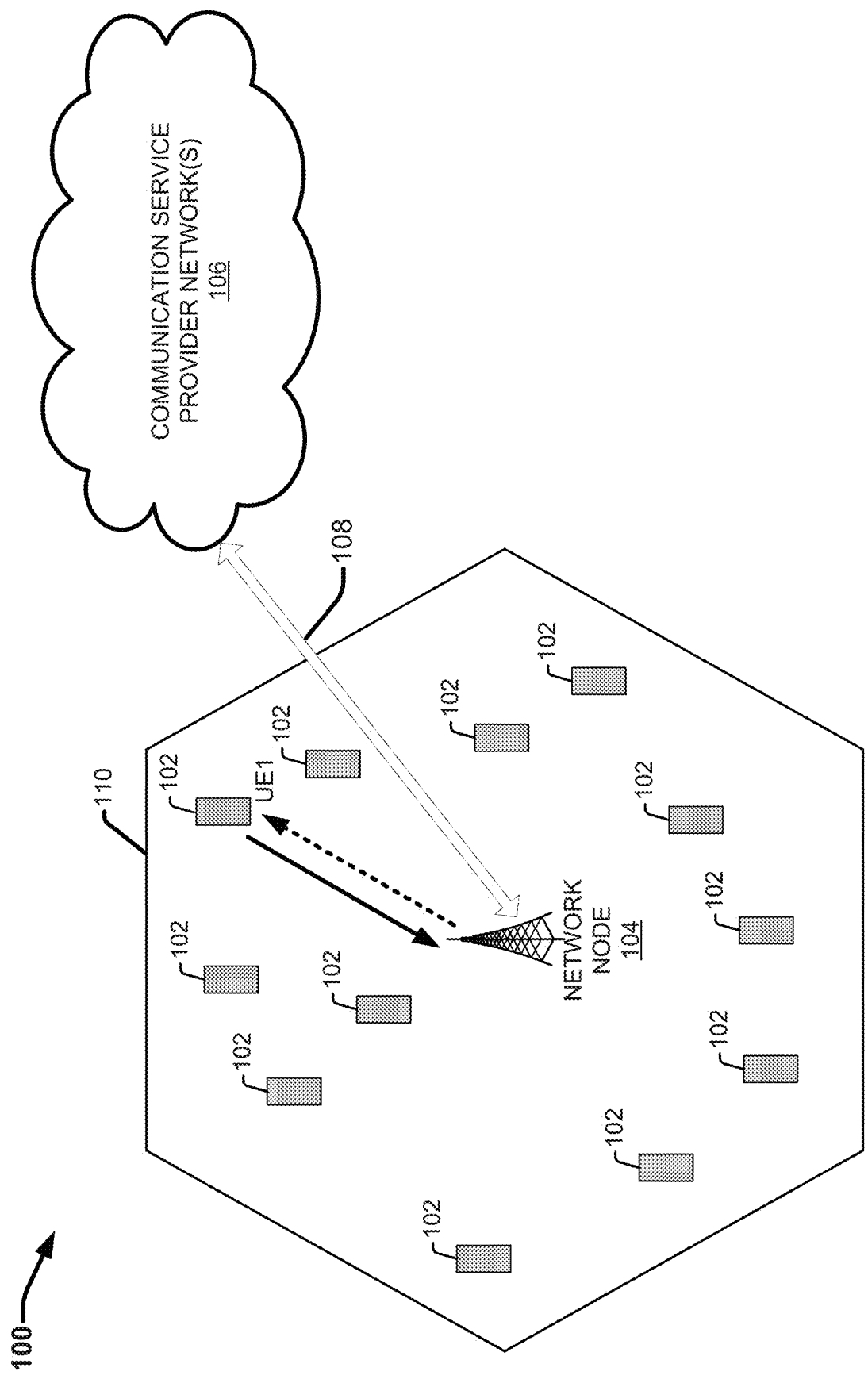
FIG. 1 is an illustration of an example wireless communication system that facilitates NR access communication schemes with phase tracking in accordance with various aspects and embodiments of the subject disclosure.

The following detailed description is merely illustrative and is not intended to limit embodiments and/or application or uses of embodiments. Furthermore, there is no intention to be bound by any expressed or implied information presented in the preceding sections or in the Detailed Description section.

Since in general, NR operates at higher frequency bands compared to the legacy wireless communication devices, 5G NR communication systems have applied the phase tracking reference signal (PTRS) protocol introduced by the 3GPP Release to enable tracking phase variations across the transmission duration, such as one time/frequency slot. These phase variations can come from phase noise in the local oscillators, primarily at higher frequencies where the phase noise tends to be higher. In this regard, phase noise typically increases as a function of oscillator carrier frequency. PTRSs can be utilized at high carrier frequencies (such as mmWave) to mitigate phase noise.

Usage of PTRSs is controlled by the network node (e.g., an eNodeB, a base station (BS), or the like) and they can be dynamically applied or not applied based on need. For example, there are many reasons why a network node may decide to activate or otherwise enable a PTRS protocol. For instance, the network node may employ PTRSs based on the selected frequency of operation. That is if the NR carrier is operating at high frequency, such as greater than 6.0 gigahertz (GHz) for example, then the network node can choose to enable PTRS usage to mitigate potential phase noise. In the other cases, the network node can choose to enable PTRS usage for communications with a UE if the network node observers a high packet loss error rate for that particular UE. The PTRS parameters are also configurable. In this regard, the number of resource elements used for allocating the PTRSs can be dynamically configured based on various factors, such as the scheduled modulation and coding schemes (MCS)s used for transmission, the allocated bandwidth, the quality of the oscillators, the carrier frequency, the OFDM subcarrier spacing, and the like.

However, despite this adaptive enablement and tailoring of PTRS parameters based on network conditions provided at the network node, an inherent imbalance is established between the UE and the network node with respect to link estimation. In particular, an accurate CSI estimation requires knowledge of the number of resource elements available for data traffic. Because the number of allocated resource elements used for the PTRSs can dynamically vary based on MCS scheduling, allocated bandwidth and the like, and the UE computes the CSI before the network node has selected a PTRS allocation scheme, the UE is blind to the subsequent PTRS resource element allocation. Since the UE does not know the allocated MCS and the scheduled number of resource blocks a priori, the CSI computed by the UE is not accurate. As a result, when the conventional 3GPP PTRS standard is applied, there is significant reduction in throughput of the NR system due to this mismatch of CSI.

The disclosed subject matter is directed to techniques for eliminating this throughput reduction attributed to CSI mismatch associated with the 3GPP PTRS protocol by configuring the UE to determine or assume an expected PTRS structure or resource block allocation a priori and compute the CSI estimation based on the expected PTRS allocation. Accordingly, when computing the reference resources for the CSI calculation, the UE can exclude those resources on which it expects the PTRSs to be transmitted by the network node.

In various embodiments, based on a determination by the network node to employ PTRSs to mitigate phase noise (e.g., based on the frequency range operation of the NR carrier), the network node can notify the UE that PTRS will be used in association subsequent downlink communications between the network node and the UE. In this regard, the network node can inform the UE that PTRS mode has been activated and configure the UE to operate according to the PTRS mode. The UE can then determine or assume an expected PTRS structure to be used. For example, in some implementations, the expected PTRS structure can be a predefined/preconfigured PTRS structure or a default PTRS structure which can be assumed by the UE. In other implementations, the UE can determine the expected PTRS structure based on previously received downlink control information (DCI) from the network node. The UE can further determine the CSI information based on the expected PTRS structure and received pilot and/or UE specific reference signals, such as CSI reference signals (CSI-RS). In this regard, the UE can determine the CSI information based on the number of resources assumed to be allocated to the PTRSs based on the expected PTRS density the time and frequency domains. The CSI estimation can involve determining the rank indicator (RI), precoding matrix indicator, and channel quality information (CQI), based at least in part on the excepted PTRS structure. The UE can further report the determined CSI information back to the network node using the uplink control channel or the physical uplink shared channel (PUSCH).

Hence with the disclosed techniques, the UE can determine or estimate accurate CSI and transmit this accurate CSI to the network node for use by network node when determining downlink communication scheduling parameters. In some embodiments, the UE can also provide information about the determined or assumed PTRS structure that the UE used in the CSI computation, thereby providing more information to the network for better scheduling. For example, in some implementations, the network node can be configured to apply the UE determined PTRS structure. Accordingly, with the disclosed techniques for computing CSI in association with PTRS application, the UE computes accurate CSI parameters and informs to the network, thereby providing accurate link/channel estimation for better link adaptation. This in turn increases the link and system throughput of the 5G system providing huge gains over the conventional techniques.

In accordance with one or more embodiments, a device (e.g., a UE) is provided that comprises a processor and a memory that stores executable instructions that, when executed by the processor, facilitate performance of operations. These operations can comprise receiving, from a network device (e.g., an eNodeB or the like) of a wireless communication network, activation information indicating that a PTRS protocol has been activated for wireless communication between the device and the network device. The method can further comprise determining a resource density of resource elements of the wireless communication network allocated for PTRS protocol, determining CSI based on the resource density, and sending the channel state information to the network device. In this regard, based on reception of the CSI information, the network device can employ the channel state information to determine a downlink communication scheduling parameter for a downlink transmission of the wireless communication.

In various embodiments, the determining the resource density comprises applying predefined configuration information for the PTRS protocol that sets the resource density to a defined time density value and a defined frequency density value. For example, in some implementations, the defined time density value and the defined frequency density value are respectively set to zero and reflect an assumption that no resource elements are used for the PTRS protocol. In another implementation, the defined time density value can be set to every $L^{th}$ OFDM symbol (e.g., 2.0 $L_{PT-RS}$), and the defined frequency density value can be set to every Kth resource block (e.g., comprises 5.0 $K_{PT-RS}$).

In some embodiments, the device can be configured to employ the defined time density value and the defined frequency density value (e.g., which can respectively correspond to default or prefixed values), each time the device subsequently recalculates the CSI for the link established between the device and the network device. In this regard, the device operations can further comprise, employing the defined time density value and the defined frequency density value in association with determining updated CSI after the sending. In other embodiments, the device can be configured to employ the default or predefined PTRS density values for the initial CSI calculation (a priori to integration of PTRSs in downlink communications sent from the network node).

Then, after downlink information is received that identifies or indicates the applied PTRS structure (e.g., received via the downlink control channel), the UE can recalculate the CSI based on the applied PTRS structure. In this regard, the device operations can further comprise, in response to the sending the initial CSI calculation to the network node, receiving downlink control information from the network device in association with a downlink traffic data transmission received from the network device, and determining an updated resource density of the resources elements of the wireless communication network allocated for the PTRS protocol based on the downlink control channel information. The operations can further comprise determining updated CSI based on the updated resource density and sending the updated CSI to the network device. In this regard, based on reception of the updated CSI, the network device can be configured to employ the updated CSI to determine a downlink communication scheduling parameter for a downlink transmission of the wireless communication.

In another embodiment, a network device of a wireless communication network is provided that comprises a processor and a memory that stores executable instructions that, when executed by the processor, facilitate performance of operations. These operations can comprise sending activation information to a device indicating that a PTRS protocol has been activated for wireless communication between the device and the network device. Based on the sending, operations further comprise receiving, by the network device, CSI for a communication channel between the network device and the device to be used for the wireless communication, wherein the CSI information was determined based on a default PTRS resource density of resource elements of the wireless communication network allocated for the PTRS protocol. The operations can further comprise employing, by the network device, the CSI to determine downlink communication scheduling parameters for a downlink transmission of the wireless communication.

In various implementations, the operations can further comprise determining, by the network device, an actual PTRS resource density of the resource elements to allocate for the PTRS protocol. For example, the network device can determine a preferred PTRS resource density in the time and frequency domains based on scheduled MSCs and scheduled bandwidth, respectively. In other embodiments, the network device can receive the default PTRS applied be the UE and use the default PTRS density, at least for initial downlink transmissions. The operations can further comprise configuring, by the network device, a downlink data transmission with a PTRS in accordance with the actual PTRS resource density, and sending, by the network device, the downlink data transmission to the device. In some implementations, then network device can also send DCI (e.g., via the downlink control channel) in association with the downlink data transmission, wherein the DCI comprises information identifying or indicating the actual PTRS resource density used. In this regard, in one or more embodiments, based on sending the DCI, the device can be configured to recalculate the CSI based on the actual PTRS resource density, and report the recalculated CSI back to the network device.

In some embodiments, elements described in connection with the disclosed systems can be embodied in different forms such as a computer-implemented method, a computer-readable or machine-readable storage medium, or another form.

The subject disclosure is now described with reference to the drawings, wherein like reference numerals are used to refer to like elements throughout. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure. The terms scheme, protocol, configuration and the like, are used interchangeably throughout the specification in various contexts to refer to a defined manner for formatting, transmitting or receiving information.

FIG. 1 is an illustration of an example wireless communication system 100 that facilitates NR access communication schemes with phase tracking in accordance with various aspects and embodiments of the subject disclosure. System 100 can comprise a plurality of UEs 102 and a radio network node 104. The non-limiting term user equipment (UE) is used herein to refer to any type of wireless device that can communicate with a radio network node in a cellular or mobile communication system. Some examples UEs can include but are not limited to, a target device, a device to device (D2D) UE, a machine type UE or UE capable of machine to machine (M2M) communication, a portable digital assistant (PDA), a tablet personal computer (PC), a mobile terminal, a smart phone, a laptop, a laptop embedded equipped (LEE), a laptop mounted equipment (LME), USB dongles, a wearable device, a virtual reality (VR) device, a heads-up display (HUD) device, a smart car, and the like. In one or more embodiments, the respective UEs 102 (and network node 104) can include two or more antennas (not shown) thereby supporting multiple-input and multiple output (MIMO) communications in association 5G NR communication schemes with phase tracking. The number of antennas provided on a UE 102 can vary (e.g., from two to hundreds or more to accommodate massive MIMO systems). In this regard, in accordance with various embodiments, wireless communication system 100 can be or include a MIMO system. MIMO systems can significantly increase the data carrying capacity of wireless systems. For these reasons, MIMO is an integral part of the 3GPP and 4GPP generation wireless systems. Wireless communication system 100 can further support the massive MIMO communication protocols introduced by 5G NR that employ hundreds of antennas at the transmitter side and receiver side.

In the embodiment shown, system 100 is or includes a wireless communication network serviced by one or more wireless communication network providers. The UEs 102 can be communicatively coupled to the wireless communication network via the network node 104. In this regard, a UE 102 can send and/or receive communication data via a wireless link or channels to the network node 104. For example, the dashed arrow lines from the network node 104 to example UE1 represent downlink communications and the solid arrow lines represent uplink communications. It should be appreciated that these arrow lines are merely provided to demonstrate wireless communication links between a UE and the network node 104. In this regard, although arrowed lines are not drawn for every depicted UE 102, it should be appreciated that all depicted UEs can wirelessly communicate with the network node 104 using uplink and downlink communications.

The non-limiting term network node (or radio network node) is used herein to refer to any type of network node serving a UE 102 and/or connected to another network node, network element, or another network node from which the UE 102 can receive a radio signal. Examples of network nodes (e.g., network node 104) can include but are not limited to: a base station (BS) device, a Node B device, a multi-standard radio (MSR) device (e.g., an MSR BS), a gNodeB device, an eNode B device, a network controller device, a radio network controller (RNC) device, a base station controller (BSC) device, a relay device, a donor node device controlling relay, a base transceiver station (BTS) device, an access point (AP) device, a transmission point device, a transmission node, an RRU device, an RRH device, node devices in distributed antenna system (DAS), and the like. In accordance one or more embodiment, the network node 104 can include two or more antennas to support various MIMO and/or massive MIMO communications in association phase tracking.

System 100 can further include one or more communication service provider networks 106 that facilitate providing wireless communication services to various UEs, including UE 102, via the network node 104 and/or various additional network devices (not shown) included in the one or more communication service provider networks 106. In the embodiment shown, the area defined by the hexagon indicates a single wireless network cell 110 serviced by the network node 104. It should be appreciated however that system 100 can include a plurality of cells respectively serviced by network nodes that are respectively communicatively coupled to the one or more communication service provider networks 106. In this regard, the one or more communication service provider networks 106 can include various types of disparate networks, including but not limited to: cellular networks, femto networks, picocell networks, microcell networks, internet protocol (IP) networks Wi-Fi service networks, broadband service network, enterprise networks, cloud-based networks, and the like. For example, in at least one implementation, system 100 can be or include a large scale wireless communication network that spans various geographic areas. According to this implementation, the one or more communication service provider networks 106 can be or include the wireless communication network and/or various additional devices and components of the wireless communication network (e.g., additional network devices and cell, additional UEs, network server devices, etc.). The network node 104 can be connected to the one or more communication service provider networks 106 via one or more backhaul links 108. For example, the one or more backhaul links 108 can include wired link components, such as but not limited to: like a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation.

Although the subject disclosure is directed to systems employing 5G or NR communications technologies, it should be appreciated that system 100 can employ various wireless communication technologies to facilitate wireless radio communications between devices (e.g., the UE 102 and the network node 104). In this regard, the disclosed techniques for CSI estimation in association with PTRS integration can be applied to any RAT or multi-RAT system where the UE operates using multiple carriers, such as but not limited to: long term evolution (LTE), frequency division duplex (FDD), time division duplex (TDD), FDD/TDD, wideband code division multiple access (WCMDA), high speed packet access (HSPA), WCMDA/HSPA, global system for mobile communication (GSM), 3GGP, GSM/3GGP, Wi Fi, WLAN, WiMax, CDMA2000, and the like.

Various embodiments of the disclosed techniques for CSI estimation in association with application of PTRS activation are described in the context of a MIMO system or usage of MIMO communication scheme with ($N_t$,$N_r$), where $N_t$ denotes the number of transmit antennas and Nr denotes the receive antennas. In this regard, various example implementations are described with reference to a $4_t \times 4_r$ MIMO system, however the disclosed techniques are not limited to a $4_t \times 4_r$ MIMO system. For example, the disclosed techniques can be equally applied to an $8_t \times 8_r$ MIMO system, or for any MIMO system wherein $N_t \geq 2$ wherein the CSI estimation of the precoding matric indicator (PMI) and the (RI) estimation is appropriate. In this regard, the PMI can be defined as an index within a codebook or the precoder itself depending on the context. Various embodiments are described assuming a closed-loop MIMO transmission scheme is used in accordance with NR and LTE based systems. However, the disclosed techniques re applicable to any RAT or multi-RAT system where the UE operates using closed-loop MIMO (e.g., HSDPA, Wi-Fi/WLAN, WiMax, CDMA2000 etc). The embodiments are applicable to single carrier as well as to multicarrier (MC) or carrier aggregation (CA) operation of the UE in conjunction with MIMO in which the UE is able to receive and/or transmit data to more than one serving cells using MIMO. The term carrier aggregation (CA) is also called (e.g. interchangeably called) "multi-carrier system", "multi-cell operation", "multi-carrier operation", "multi-carrier" transmission and/or reception. It is noted that the solutions outlined equally applies for Multi RAB (radio bearers) on some carriers (that is data plus speech is simultaneously scheduled). Similarly, the solutions are applicable where some UEs 102 are scheduled using eMBB, some UEs 102 are scheduled using URLLC, and some UEs 102 are using mMTC applications.

In accordance with various embodiments, the network node 104 and a UE 102 can establish a wireless link connection to perform wireless communication using a MIMO protocol. In association with establishing the wireless link and employing the wireless link for data communication, a general downlink messaging sequence is performed that the network node 104 sending the UE 102 downlink cell specific and/or UE specific and/or common channels sounding signals (also referred to herein as pilot signals). For example, these initial reference signals can include channel state information reference signals (CSI-RS) are specifically intended to be used by US to acquire CSI and beam specific information (beam RSRP). In 5G CSI-RS is UE specific so it can have a significantly lower time/frequency density. From the pilot or reference signals, the UE computes the channel quality estimate (e.g., typically the signal-to-noise-plus interference (SINR) ratio), and then computes the parameters needed for CSI reporting. For example, based on the channel quality estimate, the UE can determine the precoding matrix index (PMI), the rank information (RI), the channel quality indicator (CQI), the CSI-RS resource indicator (CRI, which can correspond to the beam indicator), and the like. These parameters are collectively referred to as the channel state information (CSI). The UE 102 then sends the CSI information to the network node via a feedback channel either on request from the network a-periodically or configured to report periodically. The network node 104 scheduler uses the CSI in choosing the parameters for scheduling of this particular UE. For example, for downlink data transmission, the network node 104 scheduler uses the CSI information and to select or determine the precoding matrix as suggested by the UE (or it can choose on its own other than the UE recommended PMI), CQI, the transport block size, etc.

In some MIMO systems, the network node can then multiply the traffic data by the precoding matrix selected by the network node and transmit the data traffic to the UE via the downlink data traffic transmission channel. The UE 102 receiver can further estimate the effective channel (which is the channel multiplied by the precoding matrix) and demodulates the data. In some implementations, the network node further sends the scheduling parameters to the UE in the physical downlink control channel (PDCCH) as downlink control information (DCI) before actual data transfer takes place from network node 104 to the UE 102. For example, the PDCCH can carrier information about the scheduling grants, such as the number of MIM layer scheduled, transport block sizes, modulation for each codeword, parameters related to HARQ, sub-band location, etc. Note however that the type of information transmitted as DCI via the the PDCCH can vary and depends on the transmission mode and DCI format.

The 5G NR MIMO design further integrates a downlink reference signal into the downlink data transmission referred to as the demodulation reference signal (DMRS). The DMRS is a special type of physical layer signal which functions as a reference signal for decoding the physical downlink shared channel (PDSCH). In LTE (at least in TM1, 2, 3, 4), this kind of special DMRS for PDSCH is not needed because the UE can employ use the cell specific reference signal (CRS) for PDSCH decoding. However, in 5G/NR there is no CRS, hence the introduction of the DMRS. Each DMRS transmitted by the network node 104 to the UE 102 occupies specific resource elements within the downlink time/frequency grid. In this regard each DMRS transmitted to a specific UE 102 is only transmitted within the resource blocks assigned for data traffic channel transmission to that UE. Since in general the data traffic is pre-coded, the DMRS is also pre-coded with the same precoding as that of the traffic data. For example, in accordance with 5G NR MIMO communication protocols, for the downlink data transmission, the network node 104 uses the CSI to determine the precoding matrix, CQI, transport block size, etc., and then multiplies both the DMRS and the data by the precoding matrix before transmitting the data and the DMRS. As the number of transmitted layers can vary dynamically, the number of transmitted DMRS may also vary. The UE 102 can be informed about the number of transmitted layers (or the rank) as part of the scheduling information (e.g., reported as DCI) via downlink control channel.

Phase tracking reference signals (PTRS)s can be seen as an extension to DMRS intended for tracking phase variations across the transmission duration, for example, one time/frequency slot. These phase variations can come from phase noise in the local oscillators, primarily at higher frequencies where the phase noise tends to be higher. Since the main function of PTRSs is facilitate tracking phase noise variations, the PTRS should be dense in time, but can be sparse in frequency. In accordance with the 3GPP PTRS design, the PTRSs are only transmitted in combination with DMRSs and only if the network configured the PTRSs to be present. The 3GPP PTRS design further configures the first PTRS reference symbol in the PDSCH allocation to be repeated every $L^{th}$ OFDM symbol, starting with the first OFDM symbol in the allocation. For example, in accordance with a $4_t \times 4_r$ MIMO system, this equates to every $4^{th}$, $2^{nd}$, or every single, OFDM symbol. The repetition counter is reset at each DMRS occasion as there is no need for PTRS immediately after the DMRS. white boxes correspond to the DMRS. The time domain density is generally linked to the scheduled MCS signalled in the downlink control channel. In the frequency domain, PTRS symbols are transmitted every $K^{th}$ resource block. For example, with a $4_t \times 4_r$ MIMO system, this equates to every $2^{nd}$ or $4^{th}$ resource block. This results in sparse frequency domain structure. The frequency domain allocation is generally linked to the scheduled transmission bandwidth such that the higher the bandwidth, the lower the PTRS density in the frequency domain.

Figure 2:
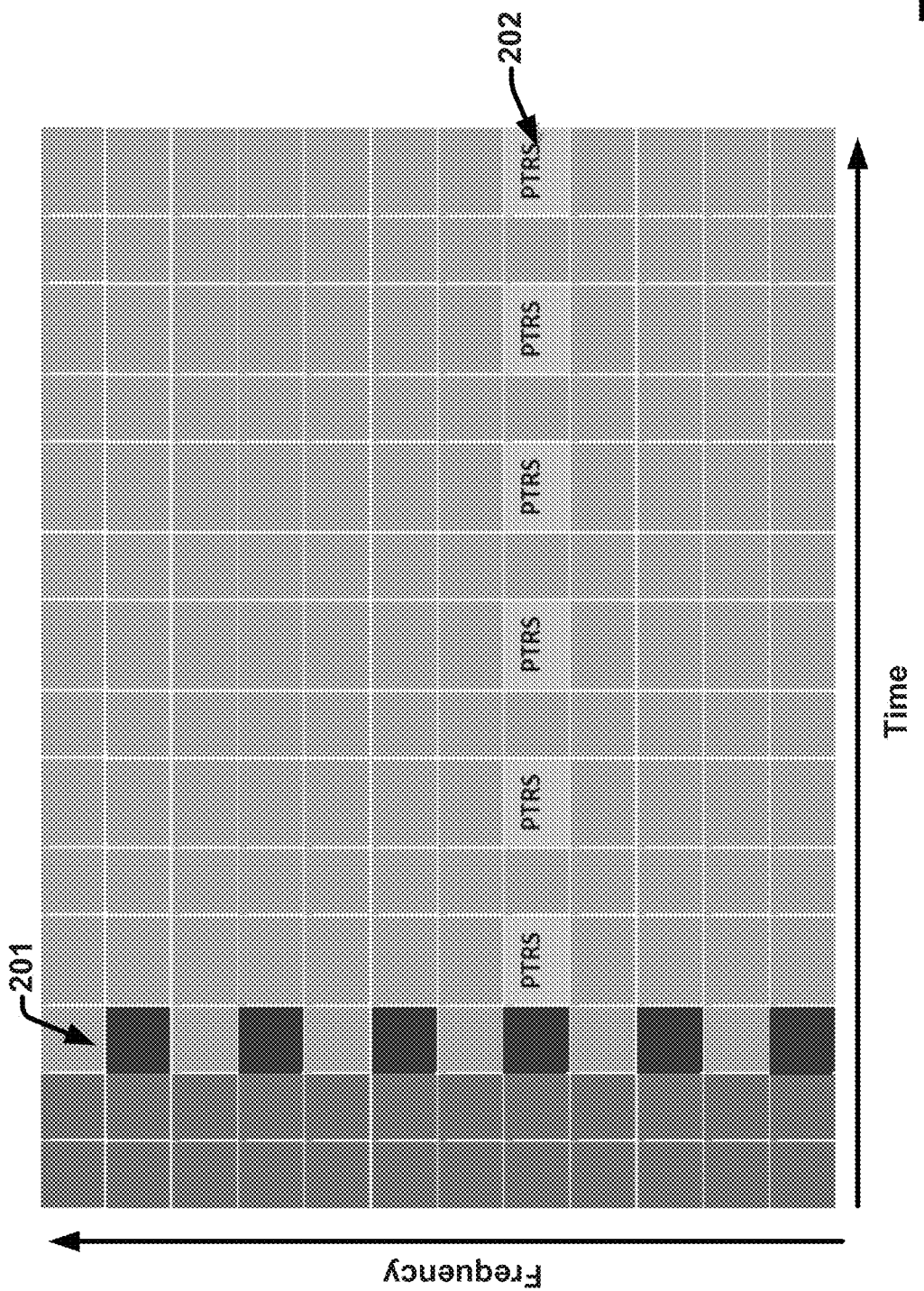
FIG. 2 is an illustration of an example PTRS resource mapping for a single resource block in accordance with various aspects and embodiments of the subject disclosure.

For example, FIG. 2 provides an illustration of an example PTRS resource mapping for a single resource block in accordance with various aspects and embodiments of the subject disclosure. In the embodiment shown, the resource block (RB) is defined by 12 rows in the frequency domain and 14 symbols (e.g., 14 columns) in the time domain. Each individual block (e.g., small square corresponding to a cell in a table) represents a resource element. The first two columns or symbol positions can be used for the control channel. The dark black boxes 201 occupying the third symbol position correspond to DMRS symbols, and the light grey boxes 202 labelled PTRS correspond to the PTRS symbols. Note that only single frequency port is used for transmitting PTRS, which is the minimum DMRS port index as signalled in the DCI. In various implementations, this same RB structure can be repeated for every K resource blocks (e.g., every 2, resource blocks, every 4 resource blocks, etc.), wherein the number K or allocated resource blocks can be identified in the downlink control channel (as DCI).

FIG. 3 presents a table defining example time density PTRS values as a function of the scheduled MCSs in accordance with various aspects and embodiments of the subject disclosure. As shown in FIG. 3, as the number of scheduled MCS increases, the PTRS time density increases. FIG. 4 presents a table defining example frequency density PTRS values as a function of the scheduled bandwidth in accordance with various aspects and embodiments of the subject disclosure. As shown in FIG. 4, as the scheduled bandwidth increases, the PTRS frequency density decreases. In this regard, in accordance with the 5G NR design for PTRS, the number of resource elements occupied by the PTRSs can change according the scheduled MCS and the allocated bandwidth. However, since the UE does not know the allocated MCS and the scheduled number of resource blocks before computing the CSI, the amount of resource elements allocated to the PTRSs will be unaccounted for in the CSI, thus causing the CSI reported to and used by the network node for downlink scheduling to be inaccurate. Hence with the 3GPP PTRS design, there is significant reduction in throughput of the system due to this mismatch of CSI.

The disclosed techniques provide an efficient solution for computing an accurate CSI at the UE that accounts for PTRS density, prior to reporting the CSI to the network. In particular, the disclosed techniques enable the UE 102 to determine an accurate CSI estimation that is consistent with both UE 102 and network node 104 communications by assuming the resource density of the resource elements allocated to the PTRSs.

In accordance with the disclosed techniques, based on a determination by the network node 104 to employ PTRSs to mitigate phase noise (e.g., based on the frequency range operation of the NR carrier), the network node 104 can notify the UE that PTRS protocol will be used in association subsequent downlink communications between the network node 104 and the UE 102. In this regard, the network node 102 can inform the UE that PTRS mode has been activated and configure the UE to operate according to the PTRS mode. The UE 102 can then determine or assume an expected PTRS density to be used. In this regard, the UE can determine or assume the PTRS density in the time domain, which corresponds to what frequency symbols (e.g., none, every 4 symbols, every 2, symbols, every other symbol, etc.) will be used. The UE can also determine or assume the PTRS density in the frequency domain, which corresponds to what resource blocks will include the PTRS signals (e.g., every 2 resource blocks, every 4 resource blocks, etc.). The expected PTRS density can therefor reflect a combination of the PTRS density in the time domain and the PTRS density in the frequency domain. The UE 102 can further determine the CSI information based on the expected PTRS density and received pilot and/or UE specific reference signals, such as CSI-RS. In this regard, the UE can determine the CSI information based on the number of resources assumed to be allocated to the PTRSs based on the expected PTRS density the time and frequency domains. That is when computing the reference resources for CSI calculation, it won't count those resources on which it expects PTRS is transmitted by the network. The CSI calculation can involve determining the RI, PCI, and CQI, based at least in part on the excepted PTRS density in the time and frequency domains. The UE 102 can further report the determined CSI information back to the network node 104 using the uplink control channel or the PUSCH. The network node 104 can further employ this accurate CSI to determine the downlink communication scheduling parameters (e.g., the precoding matrix, CQI, transport block size, scheduled MCS, etc.). In some embodiments, the UE 102 can also provide information about the determined or assumed PTRS structure that the UE 102 used in the CSI computation, thereby providing more information to the network for better scheduling.

Figure 5:
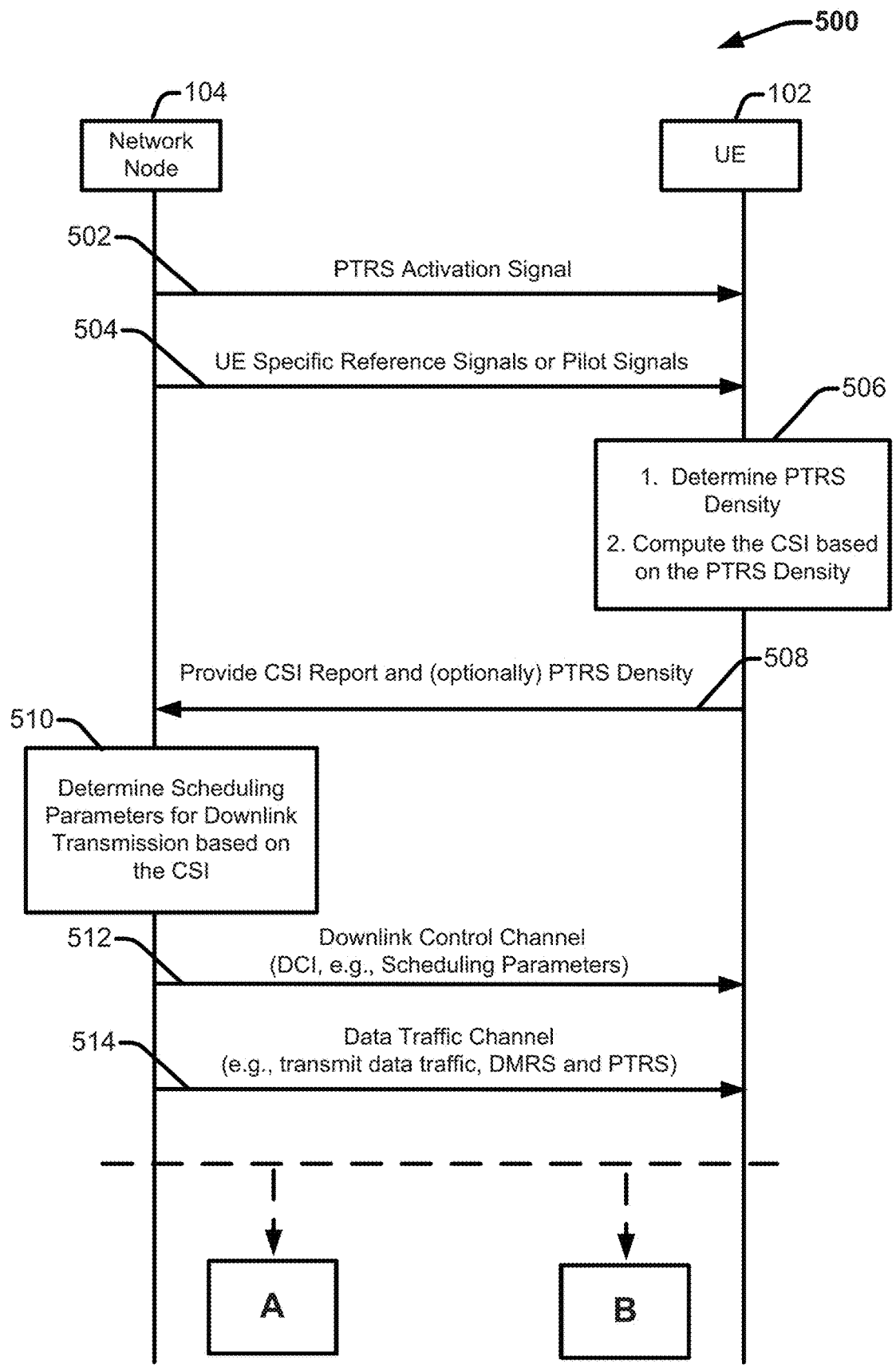
FIG. 5 presents a signaling diagram of an example message sequence for downlink data transfer with channel state information (CSI) estimation based on a user equipment (UE) determined PTRS density in accordance with various aspects and embodiments of the subject disclosure.

FIG. 5 presents a signaling diagram of an example message sequence 500 for downlink data transfer with CSI estimation based on a UE determined PTRS density in accordance with various aspects and embodiments of the subject disclosure. Repetitive description of like elements employed in respective embodiments is omitted for sake of brevity.

In accordance with message sequence 500, at 502 the network node 104 can initially send the UE 102 a PTRS activation signal to indicate to the UE 102 that the network has activated a PTRS mode or PTRS protocol for application in association with subsequent downlink data transmissions sent from the network node to the UE. The network node 104 can dynamically enable or active (and disable) PTRS for various reasons. For example, in some implementations, the network node 104 can enable PTRS based on the frequency operation of the carrier being greater than a threshold frequency (e.g., 6.0 GHz). In another example, the network node 104 can enable PTRS based on detection of an increase in packet errors received from the UE 102. In this regard, the PTRS activation signal can notify the UE 102 that PTRS has been enabled and direct the UE to prepare for receiving PTRSs in subsequent downlink transmissions. In some embodiments, the PTRS activation signal can instruct otherwise prompt the UE 102 to determine and report the current CSI. As described infra, this CSI calculation can account for an expected or predicted PTRS density to be used by the network node 104. Techniques for determining the UE expected or predicted PTRS density are described in greater detail infra. In some embodiments, the PTRS activation signal can be communicated to the UE using radio resource control (RRC) signaling (e.g., via the RRC signaling layer) in accordance with the RRC protocol. For example, the RRC signaling layer corresponds to a layer that exists between the UE 102 and the network node 104 at the Internet protocol (IP) level. Some functions of the RRC protocol include for example, connection establishment and release functions, broadcast of system information functions, radio bearer establishment functions, reconfiguration and release functions. RRC connection mobility procedures, paging notification and release functions and outer loop power control functions. In some embodiments, at 504, the network node 104 can also send UE specific reference signals and/or pilot signals to facilitate the CSI calculation.

Once the UE 102 has been informed that PTRS has been enabled or activated, the UE can be configured to first, determine the PTRS density, and second compute the CSI based on the PTRS density. In this regard, the UE 102 can first determine an expected or assumed amount of network resources to be allocated to the PTRSs and exclude these resources from the PTRS calculation. In accordance with one or more embodiments, the expected or assumed amount of network resources allocated to the PTRSs can be pre-defined. In this regard, the expected or assumed PTRS density, including the time domain density (L) and the frequency domain density K, can respectively be pre-set to a default value. These default values can also be known by the network node 104 (e.g., in accordance with the defined PTRS protocol). For example, in some implementations, the default PTRS value can correspond to a PTRS time domain density value (L) of 2.0 $L_{PT-RS}$, which corresponds to every second or every other OFDM symbol starting with the first symbol (as depicted in FIG. 2). The default PTRS value can also include a default PTRS frequency density value (K) of 5.0 $K_{PT-RS}$, which corresponds to every $5^{th}$ resource block. In another implementation, the default time PTRS density value and the default frequency PTRS density value can respectively be set to zero. With this implementation, the UE 102 can be configured to calculate the CSI under the assumption that no resource elements are used for the PTRS protocol. Still in other embodiments, the UE 102 can be configured to determine the PTRS density based on previously received DCI. For example, the previously received DCI can include information that identifies of indicates a PTRS density that will be used or has been used by the network node. For instance, the DCI information can include information indicating scheduled MCS and/or allocated bandwidth from which the UE can determine an estimated or predicted PTRS density.

In some embodiments, the UE 102 can be configured to apply the predefined or default PTRS density value (e.g., L=2 and K=5, zero, or another value) for subsequent CSI computations for the link/channel established between the UE 102 and the network node 104 so long as the PTRS mode remains enabled/activated (and the connection is not otherwise disabled). In other embodiments, as discussed infra with reference to FIG. 6, the UE 102 can be configured to apply the predefined or default PTRS density value for the initial CSI computation reported to the network node 104 in response to the initial reception of the PTRS activation signal, and then apply a more accurate PTRS density value for subsequent CSI computations.

Once the UE 102 has determined the PTRS density 506 (e.g., applied the predefined PTRS density values in the time and frequency domain), the UE can compute the CSI based on the PTRS density. In some implementations, the UE 102 can also employ the UE specific reference signals and/or pilot signals (if received) to facilitate determining the CSI. In accordance with various embodiments, the CSI computation can involve determining at least the PMI, RI and CQI. The technique employed by the UE 102 to determine these CSI parameters can vary. In some embodiments, the UE can employ a mutual information method to determine the CSI parameters. In other embodiments, the UE 102 can employ a capacity-based method to determine the CSI parameters. These respective methods are now discussed.

In accordance with the mutual information method, an accurate CSI estimation for PMI, RI and CQI is achieved by maximizing the throughput while simultaneously maintaining the block-error-rate (BLER) constraint. The mutual information method mathematically characterises this problem a joint (integer) optimization problem in accordance with Equation 1 as follows:

$$\max_{CQI,PMI,RI} \text{Throughput } (CQI, PMI, RI) \quad \text{Equation 1}$$

$$\text{subject to } BLER \leq \text{Threshold}.$$

Unfortunately, this joint (discrete/integer) optimization problem does not have any closed-form solution. Accordingly, to solve this problem, a suitable PMI and RI can be estimated independent of CQI. Thereafter, a suitable CQI can be estimated accordingly for the chosen PMI (and RI). For example, consider a single-cell scenario having perfect time and synchronization, a received system model for (closed-loop) SM per sub-carrier (post-fast Fourier transform (FFT)) can be shown as, $$Y = HWX + N \quad \text{Equation 2,}$$

where, $Y \in X^{N_r \times 1}$ corresponds to a received signal vector, and $H \in X^{N_r \times N_t}$ describes an overall channel matrix. A complex zero-mean Gaussian noise vector $n \in C^{N_r \times 1}$ is having covariance $R_n$. An unknown complex data/symbol vector is denoted by $x \in A^{N_L \times 1}$ (having normalized power $E\{xx^H\} = R_x = I$) corresponding to M-QAM (e.g., 64-QAM) constellation A. A (complex) precoder $W_{PMI} \in \Pi^{N_t \times N_L}$ is selected from a given/known codebook $\Pi$ having $N_\Pi$ number of precoders (where, $PMI = \{0, 1, \ldots N_\Pi - 1\}$) for a given rank $\leq \min\{N_r, N_t\}$. The post-processing SINR per $i^{th}$ spatial layer for a given PMI, assuming linear-MMSE detector employed at the receiver, reads as follows:

$$SINR_i = \frac{1}{[(W_{PMI}^H H^H R_n^{-1} H W_{PMI} + I_{N_L})^{-1}]_{i,i}} - 1, \quad \text{Equation 3}$$

where $[A]_{i,i}$ corresponds to an $i^{th}$ diagonal element of a matrix A. er K (depending on the wide-band/sub-band PMI estimate).

In order to estimate a suitable PMI/RI, a link-quality metric (LQM) that represents a mean mutual information, denoted as mMI (per sub-band/wide-band) is computed in accordance with Equation 4 as follows:

$$mMI = \frac{1}{\text{rank}} \sum_{i=1}^{RI=rank} \sum_{k}^{K(i)} \log 2(1 + SINRi[k]), \quad \text{Equation 4}$$

where, I ($SINR_i$ [k]) is a mutual information that is a function of post-processing $SINR_i$ [k] (and modulation alphabet A) as given in the Mutual Information Table below for the $i^{th}$ spatial layer and $k^{th}$ resource-element. The Mutual Information Table provides example I ($SINR_i$ [k]) functions for 4-QAM, 16-QAM and 64-QAM. The number of resource-elements employed for the computation of the aforementioned LQM is given by a parameter K (which depends on the wide-band/sub-band PMI estimate).

| Mutual Information Table | |
| --- | --- |
| Modulation Alphabet A | Mutual Information per symbol |
| 4-QAM | $I(SINR_i) = J\left(\sqrt{4 SINR_i}\right)$ |
| 16-QAM | $I(SINR_i) \approx (1/2) J\left(0.8818 \sqrt{SINR_i}\right) +$ $(1/4) J\left(1.6764 \sqrt{SINR_i}\right) + (1/4) J\left(0.9316 \sqrt{SINR_i}\right)$ |
| 64-QAM | $I(SINR_i) \approx (1/3) J\left(1.1233 \sqrt{SINR_i}\right) +$ $(1/3) J\left(0.4381 \sqrt{SINR_i}\right) + (1/3) J\left(0.4765 \sqrt{SINR_i}\right)$ |

$$J(a) \approx \begin{cases} -0.04210610 a^3 + 0.209252 a^2 - 0.00640081 a, & 0 < a < 1.6363 \\ 1 - \exp(0.00181491 a^3 - 0.142675 a^2 - 0.08220540 a + 0.0549608), & 1.6363 < a < \infty. \end{cases}$$

After determining the estimate of mMI (per sub-band/wide-band), the UE can estimate the PMI and RI jointly employing the optimization problem of Equation 1 in an unconstrained form in accordance with Equation 6 as follows:

$$\max_{PMI,RI} mMI(PMI, RI). \quad \text{Equation 6}$$

The capacity approach is similar to the mutual information method, however with the capacity approach, instead of fining the mutual information, the capacity is calculated according to Equation 7, $$\text{capacity} = \frac{1}{\text{rank}} \sum_{i=1}^{RI=rank} \sum_{k}^{K(i)} \log2(1 + SINRi[k]). \quad \text{Equation 7}$$

In accordance with both the mutual information method and the capacity method, the RI and the PMI can be determined as follows:
1. The UE 102 estimates the channel via UE specific reference signals/pilot signals appropriately.
2. The UE 102 compute the post-processing SINR for each entity in the precoding codebook.
3. The UE 102 computes the LQMs either capacity or mutual-information of each entity using the method described above.
4. The UE 102 find the precoding control index and the corresponding RI which maximizes the LQM.
5. The UE 102 compute the PMI based on the RI chosen in step 4.
6. The UE 102 compute the CQI based on the RI/PMI chosen in steps 4 and 5.

In accordance with both the mutual information method and the capacity method, it can be observed that the network needs to know the value of K(i) for computing the CSI. However, the values of K vary based on the PTRS density. In this regard, by determining the PTRS or assuming the PTRS density, the UE 102 can determine an accurate CSI calculation in accordance with various embodiments describe herein.

With reference again to FIG. 5, after the UE 102 has determined the CSI based on the PTRS density, the UE 102 can provide the CSI information to the network node 104 via a CSI report. In some implementations, the UE can also include the determined or assumed PTRS density used in the CSI calculation in the CSI report, thereby providing more information to facilitate optimizing scheduling. At 510, based on receiving the CSI information, the network node 104 can determine the scheduling parameters for the downlink transmission based on the CSI. For example, the network node 104 can determine the precoding matrix (based on the recommended PMI or autonomously), the CQI, the transport block size, etc. The network node 104 can further determine the PTRS density parameters for the PTRSs. For example, the network node 104 can determine the PTRS time density L and the PTRS frequency density K for allocating the PTRS symbols. In some embodiments, the network node 104 can apply the determined or assumed PTRS density provided by the UE 102.

Once the network node 104 has determined the scheduling parameters, at 512 the network node can provide information identifying the scheduling parameters to the UE 102 via the downlink control channel (PDCCH) and/or the PDSCH. For example, the DCI information can include information regarding the MIMO layers scheduled, transport block sizes, modulation for each codeword, parameters related to HARQ, sub band locations, etc. In some embodiments, the DCI can also include information that identifies or indicates the selected PTRS density applied by the network node 104. For example, the DCI can explicitly identify the PTRS density used. In another example, the DCI can identify the scheduled MCS and the allocated bandwidth from which the PTRS density can be determined. At 514, the network node can further configure the data traffic, the DMRS, and the PTRS based on the scheduling parameters, and at 512 transmit the data traffic, DMRS and the PTRS accordingly via the data traffic channel.

Figure 6:
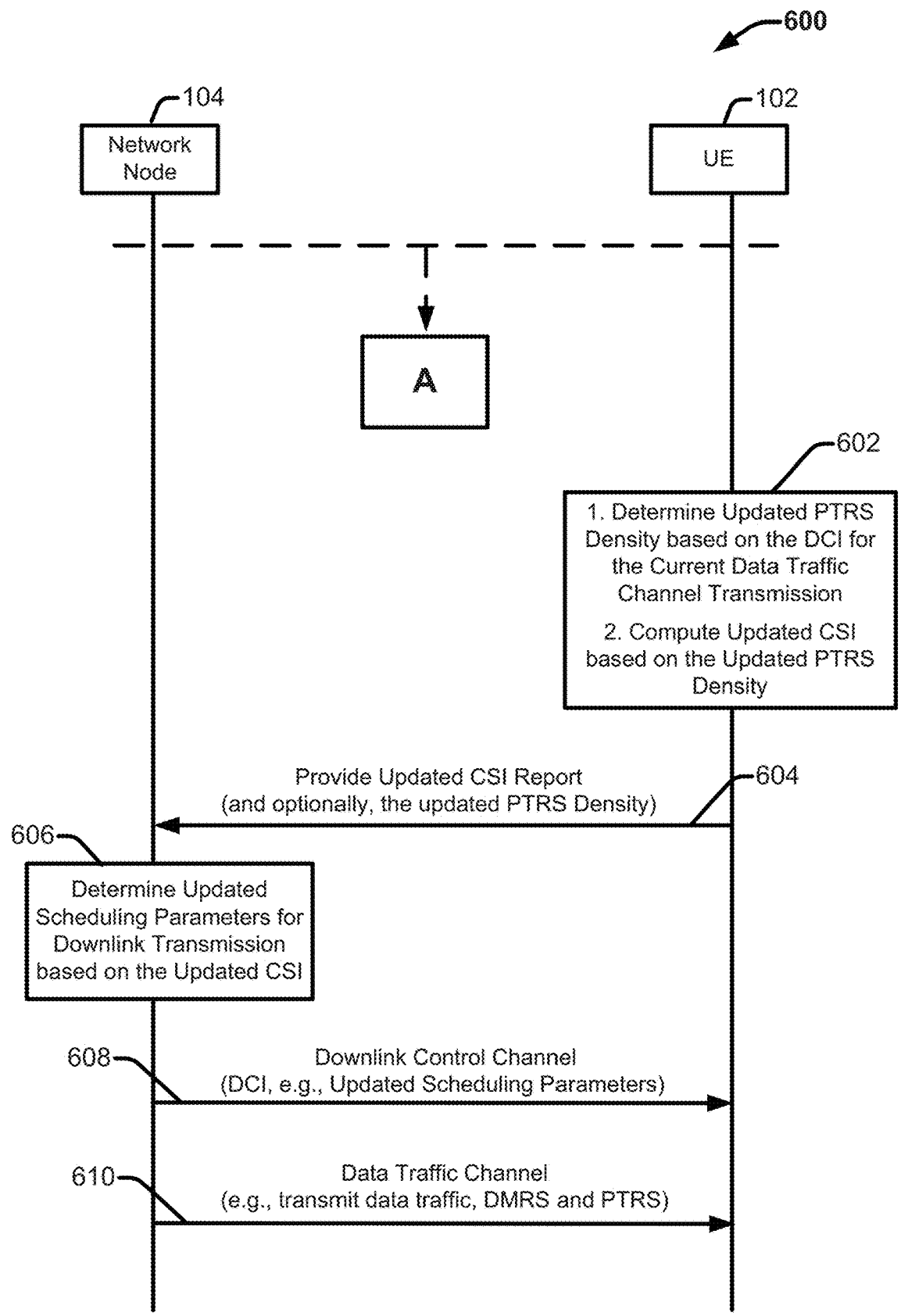
FIG. 6 presents a signaling diagram of another example message sequence for downlink data transfer with CSI estimation based on a UE assumed default PTRS density in accordance with various aspects and embodiments of the subject disclosure.
Figure 7:
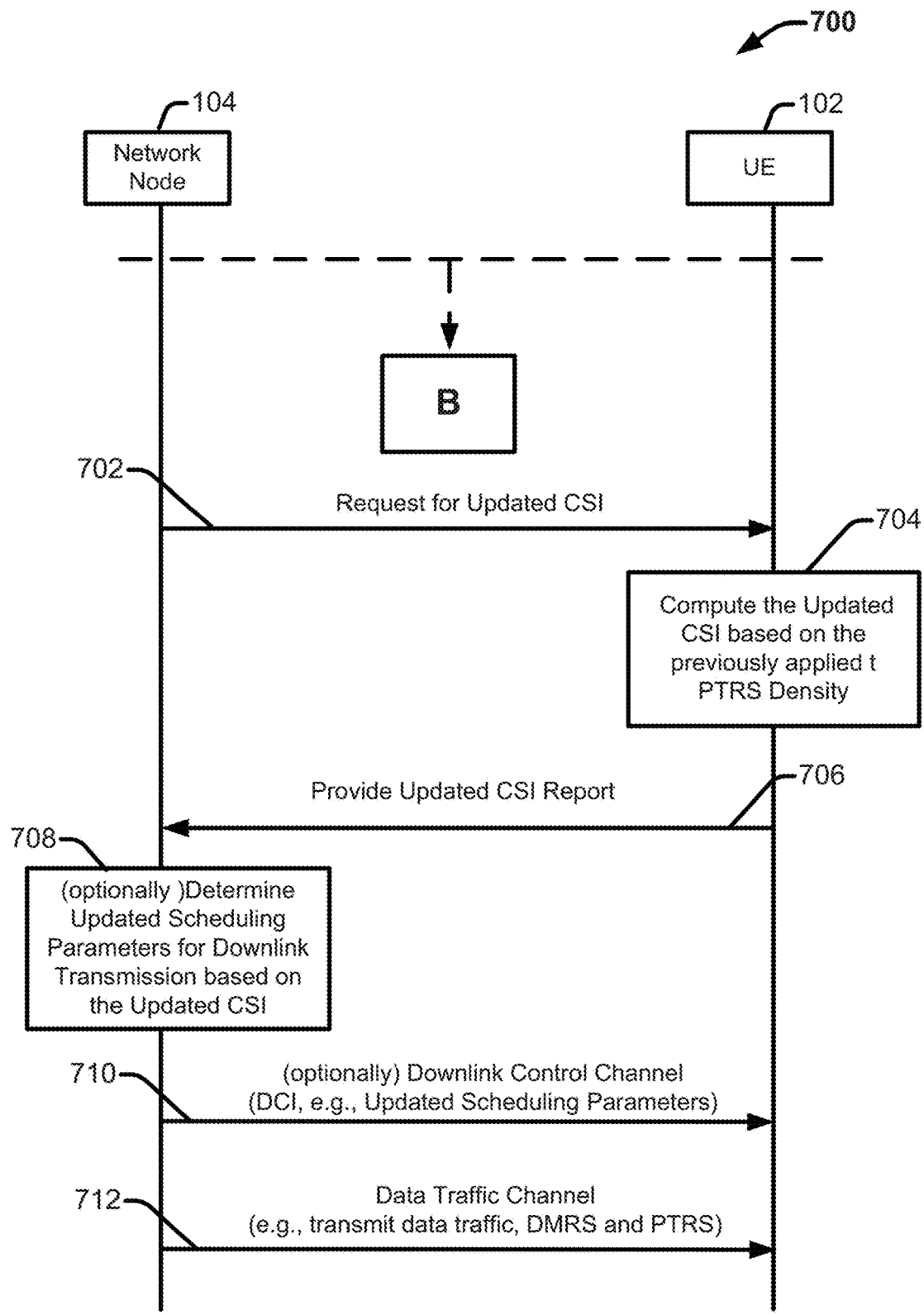
FIG. 7 presents a signaling diagram of another example message sequence for downlink data transfer with CSI estimation based on a UE determined PTRS density in accordance with various aspects and embodiments of the subject disclosure.

In the embodiment shown, a dashed line is drawn after 514 to indicate that additional messaging can continue between the UE 102 and the network node 104 in accordance with various additional aspects and embodiments described herein. For example, FIG. 6 presents another signaling diagram of another example message sequence 600 for downlink data transfer with CSI estimation based on a UE determined PTRS density in accordance with various aspects and embodiments of the subject disclosure. In accordance with one or more embodiments, message sequence 600 can be a continuation of message sequence 500 in accordance with route A identified in FIG. 5. Likewise, FIG. 7 presents another signaling diagram of another example message sequence 700 for downlink data transfer with CSI estimation based on a UE determined PTRS density in accordance with various aspects and embodiments of the subject disclosure. In accordance with one or more embodiments, message sequence 700 can be a continuation of message sequence 500 in accordance with route B identified in FIG. 5. Repetitive description of like elements employed in respective embodiments is omitted for sake of brevity.

With reference now to FIG. 6 in association with reference to FIG. 5, at 702, the UE can determine an updated PTRS density based on the DCI for the current data traffic channel transmission transmitted via the data traffic channel at 514. The 102 UE can further compute updated CSI based on the updated PTRS density. For example, after the UE reports the initial CSI to the network node 104 at 508, the network node 104 can provide the UE 102 with information that identifies or indicates an actual PTRS density selected for application by the network node 104 in association with the scheduled downlink data traffic transmissions transmitted to the UE via the data traffic channel. For example, in some embodiments, at 512 the network node 104 can provide the UE with CSI information via the downlink control channel (e.g., the PDCCH) that identifies the PTRS densities in the time and frequencies domains. In other embodiments, the CSI information can include scheduling information identifying the scheduled MCS and/or the allocated bandwidth, and the UE 102 can determine the corresponding PTRS densities (in time and frequency) based on the scheduled MCS and/or the allocated bandwidth. In accordance with this embodiment, the UE can determine an accurate estimation of the PTRS density because in general, the number of resources allocated for the UE and the MCS scheduled does not change significantly. In other embodiments, the UE can discern the PTRS applied based to respective downlink data traffic transmissions based on evaluating the resource allocation applied to the downlink data transmissions. In yet another embodiment, the UE can determine the actual PTRS density value (relative to the actual PTRS density applied by the network node 104) based on the scheduled PDSCH. The UE can further employ this actual (or more accurate PTRS relative to the initial PTRS density determined at 506) density value to determine updated CSI parameters. In this regard from the DCI, the PDSCH, and/or the actual traffic data transmission receive from the network node 104 after PTRS implementation, the UE can obtain accurate information for the PTRS density for the current transmission and use this information for the updated CSI computation.

Method 600 can then proceed in a similar fashion as method 500. In this regard, at 604, the UE 102 can provide the updated CSI report and optionally the updated PTRS density, to the network node 104. At 606, the network node 104 can determine updated scheduling parameters for the downlink transmission based on the updated CSI. At 608, the network node 104 can provide the UE with DCI information, such as the updated scheduling parameters, via the downlink control channel, and at 610, the network node 104 can configure and transmit the data traffic, the DMRS, and the PTRS via the data traffic channel in accordance with the updated scheduling parameters.

With reference now to FIG. 7, in another embodiment, at 702, the network node 104 can send a request to the UE for updated CSI. For example, in some implementations, the network node 104 can periodically request a CSI report. Alternatively, the UE can be configured to periodically and autonomously (e.g., without a request from the network node), recalculate the CSI and report it to the network node. At 704, unlike method 600, the UE can compute the updated CSI based on the previously applied PTRS density at 506. For example, the UE can be configured to apply the predefined or default PTRS density (e.g., zero, L=2 and K=5, or another value) in association with all CSI calculations performed by the UE for the communication channel between the UE 102 and the network node 104. Method 700 can then proceed in a similar fashion as methods 500 and 600. In this regard, at 706, the UE 102 can provide the updated CSI report and optional the updated PTRS density, to the network node 104. At 708, the network node 104 can optionally determine updated scheduling parameters for the downlink transmission based on the updated CSI. For example, in some implementation in which the CSI has not changed or has changed very little, the network node 104 can choose to continue to apply the previously determined scheduling parameters (e.g., determined at 510). At 710, the network node 104 can optionally (e.g., if they have changed) provide the UE with DCI information indicating the updated scheduling parameters via the downlink control channel. At 712, the network node 104 can configure and transmit the data traffic, the DMRS, and the PTRS via the data traffic channel in accordance with the updated scheduling parameters.

In view of the example system(s) described above, example method(s) that can be implemented in accordance with the disclosed subject matter can be better appreciated with reference to flowcharts in FIGS. 8-12. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory. Repetitive description of like elements employed in respective embodiments is omitted for sake of brevity.

Figure 8:
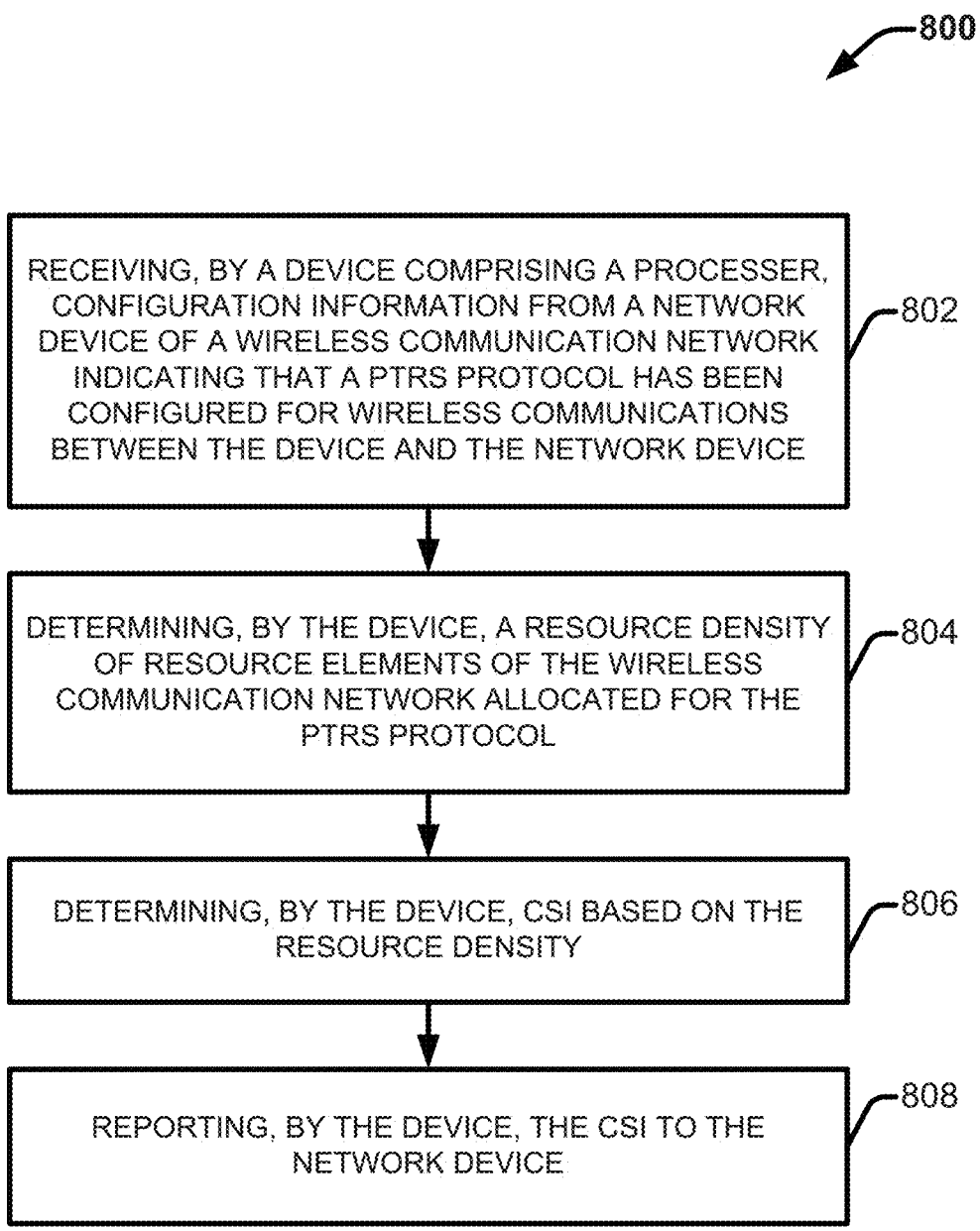
FIG. 8 presents a signaling diagram of another example message sequence for downlink data transfer with CSI estimation based on a UE assumed default PTRS density in accordance with various aspects and embodiments of the subject disclosure.

FIG. 8 presents a high-level flow diagram of an example method 800 for determining CSI by a UE based on a UE determined PTRS density in accordance with various aspects and embodiments of the subject disclosure.

At 802, a device comprising a processor (e.g., UE 102), receives configuration information from a network device (e.g., network device 104) of a wireless communication network indicating that a PTRS protocol has been configured for wireless communications between the device and the network device. At 804, the device determines a resource density of resource elements of the wireless communication network allocated for the PTRS protocol. At 806, the device determines CSI based on the resource density, and at 808, the device reports the CSI to the network device. In this regard, based on reception of the CSI, the network device is to employ the CSI to determine downlink communication scheduling parameters for downlink transmissions of the wireless communications. In one or more embodiments, the determining the resource density comprises applying predefined configuration information for the PTRS protocol that sets the resource density to a predefined time density value and a predefined frequency density value. For example, in one implementation, the predefined time density value and the predefined frequency density value are respectively set to zero and reflect an assumption that no resource elements are used for the PTRS protocol. In another implementation, predefined time density value comprises 2.0 $L_{PT-RS}$ and wherein the defined frequency density value comprises 5.0 $K_{PT-RS}$. In one or more additional embodiments, the determining the resource density comprises determining the resource density based on previously received downlink control information received from the network device.

Figure 9:
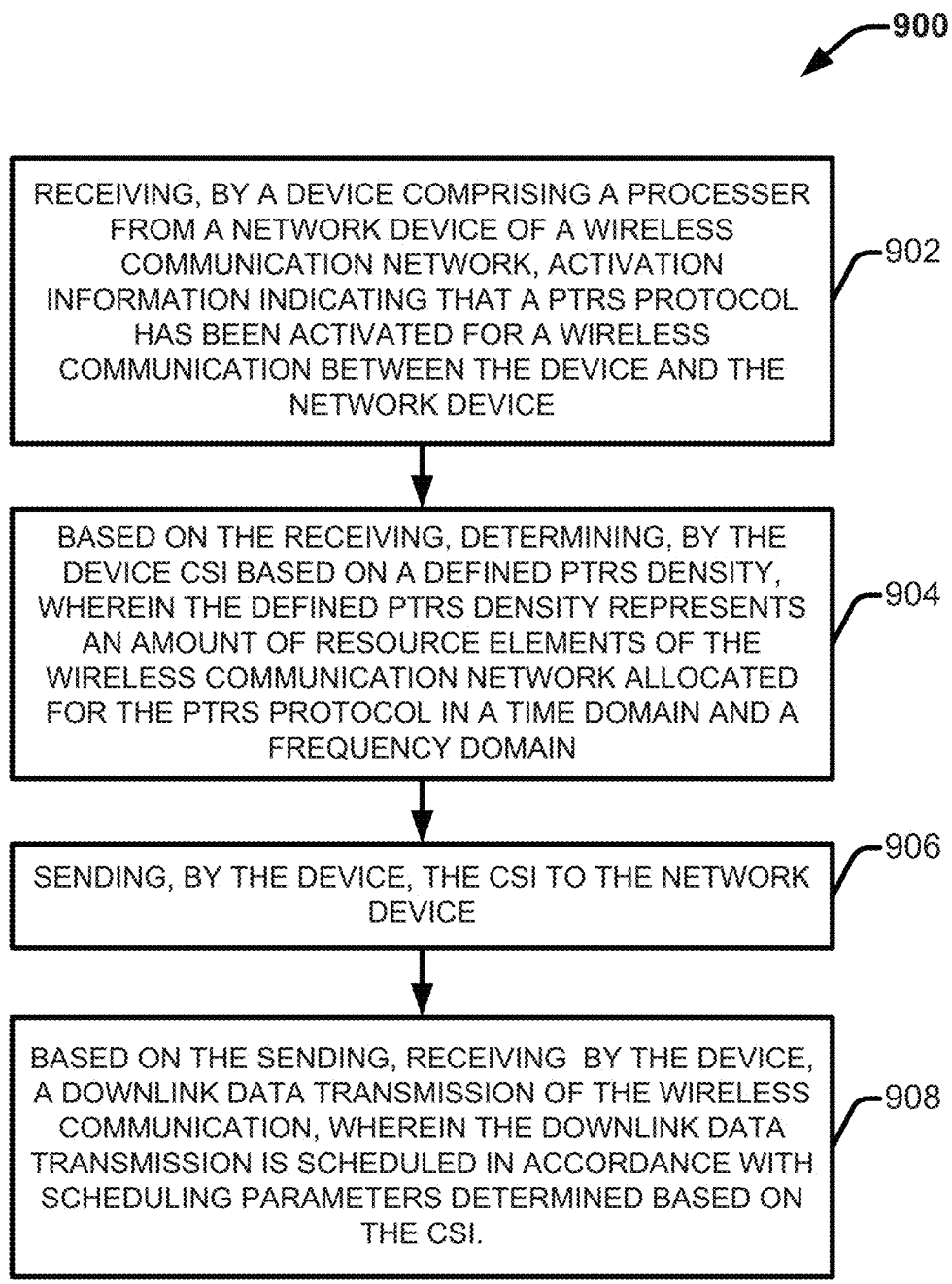
FIG. 9 presents a high-level flow diagram of an example method for determining CSI by a UE based on a UE determined PTRS density in accordance with various aspects and embodiments of the subject disclosure.

FIG. 9 presents a high-level flow diagram of an example method 900 for determining CSI by a UE based on a defined or default PTRS density in accordance with various aspects and embodiments of the subject disclosure.

At 902, a device comprising a processor (e.g., UE 102), receives activation information from a network device (e.g., network device 104) of a wireless communication network indicating that a PTRS protocol has been activated for a wireless communication between the device and the network device. At 904, based on the receiving, the device determines CSI based on a defined resource density, wherein the defined resource density represents an amount of resource elements of the wireless communication network allocated for the PTRS protocol in a time domain and a frequency domain. At 906, the device sends the CSI to the network device, and at 908, based on the sending, the device receives a downlink data transmission or the wireless communication, wherein the downlink data transmission is scheduled in accordance with scheduling parameters determined (by the network device) based on the CSI.

Figure 10:
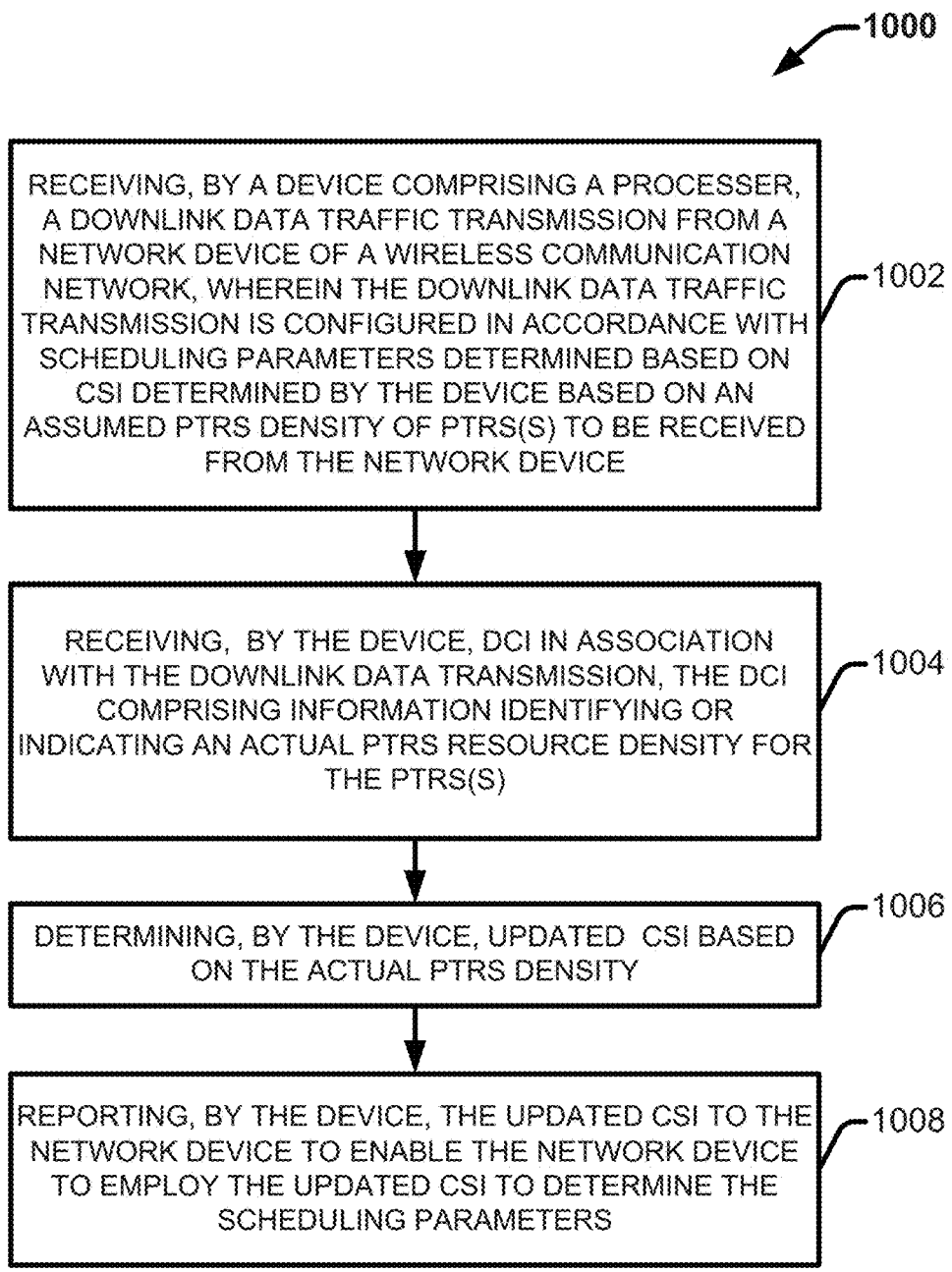
FIG. 10 presents a high-level flow diagram of an example method for determining CSI by a UE based on a defined or default PTRS density in accordance with various aspects and embodiments of the subject disclosure.

FIG. 10 presents a high-level flow diagram of another example method 1000 for determining CSI by a UE based on a PTRS density determined based on received downlink control channel information (DCI) in accordance with various aspects and embodiments of the subject disclosure.

At 1002, a device comprising a processor (e.g., UE 102), receives a downlink data traffic transmission from a network device (e.g., network device 104) of a wireless communication network. The downlink data traffic transmission is configured in accordance with scheduling parameters determined based on CSI determined by the device based on an assumed PTRS density of PTRSs to be received from the network device. At 1004, the device receives DCI in association with the downlink data transmission, the DCI comprising information identifying or indicating an actual PTRS resource density for the PTRSs. At 1006, the device determines updated CSI based on the actual PTRS density. At 1008, the device reports the updated CSI to the network device to enable the network device to employ the updated CSI to determine the scheduling parameters.

Figure 11:
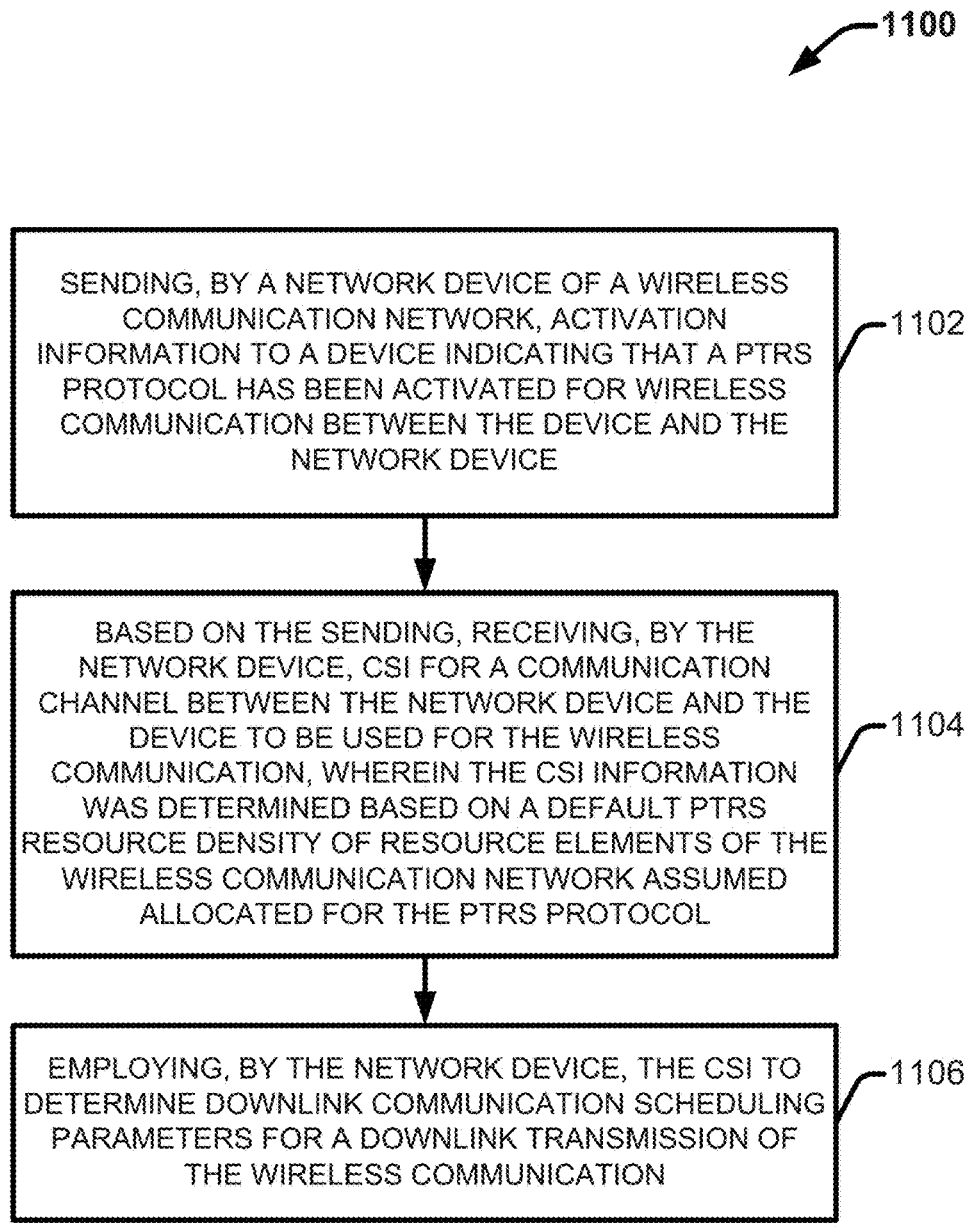
FIG. 11 presents a high-level flow diagram of another example method for determining CSI by a UE based on a PTRS density determined based on received downlink control channel information (DCI) in accordance with various aspects and embodiments of the subject disclosure.

FIG. 11 presents a high-level flow diagram of an example method 1100 for determining downlink scheduling parameters based on CSI determined by a UE based on a defined or default PTRS density in accordance with various aspects and embodiments of the subject disclosure.

At 1102, a network device (e.g., network device 104) of a wireless communication network, sends activation information to a device (e.g., UE 102) indicating that a PTRS protocol has been activated for wireless communication between the device and the network device. At 1104, based on the sending, the network device receives CSI for a communication channel between the network device and the device to be used for the wireless communication, wherein the CSI information was determined (by the UE) based on a default PTRS resource density of resource elements of the wireless communication network assumed allocated for the PTRS protocol. At 1106, the network device employs the CSI to determine downlink communication scheduling parameters for a downlink transmission of the wireless communication.

Figure 12:
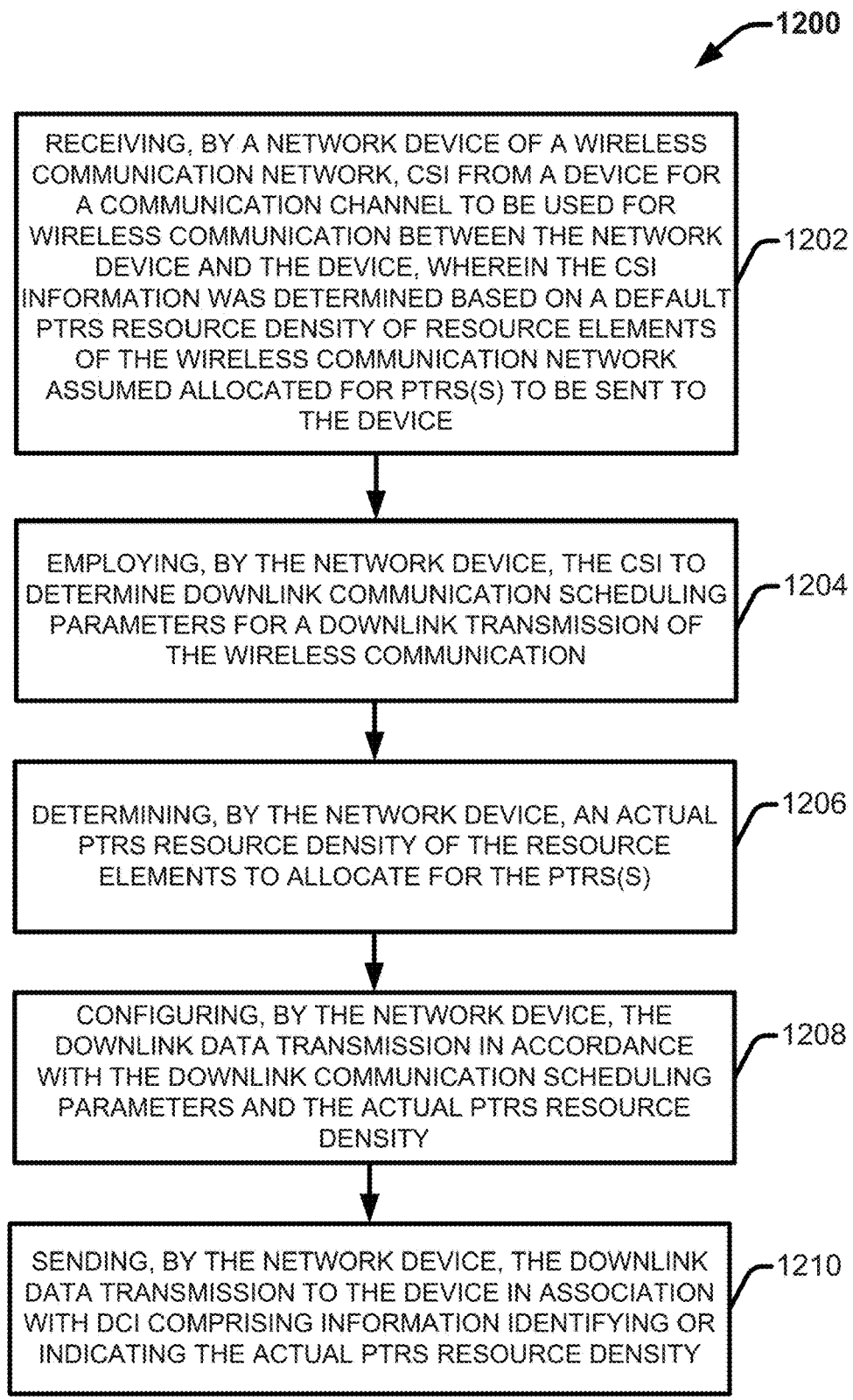
FIG. 12 presents a high-level flow diagram of an example method for determining downlink scheduling parameters based on CSI determined by a UE based on a defined or default PTRS density in accordance with various aspects and embodiments of the subject disclosure.

FIG. 12 presents a high-level flow diagram of another example method 1200 for determining downlink scheduling parameters based on CSI determined by a UE based on a defined or default PTRS density in accordance with various aspects and embodiments of the subject disclosure.

At 1202, a network device (e.g., network device 104) of a wireless communication network, receives CSI from a device (e.g., UE 102) for a communication channel to be used for wireless communication between the network device and the device, wherein the CSI information was determined (by the UE) based on a default PTRS resource density of resource elements of the wireless communication network assumed allocated for PTRSs to be sent to the device. At 1204, the network device employs the CSI to determine downlink communication scheduling parameters for a downlink transmission of the wireless communication. At 1206, the network device determines an actual PTRS resource density of the resource elements to allocate for the PTRSs. At 1208, the network device configures the downlink data transmission in accordance with the downlink communication scheduling parameters and the actual PTRS resource density. At 1210, the network device sends the downlink data transmission to the device in association with DCI comprising information identifying or indicating the actual PTRS resource density. In this regard, in some embodiments, the device can be configured to recalculate the CSI based on the actual PTRS resource density and report the recalculated CSI back to the network device.

Figure 13:
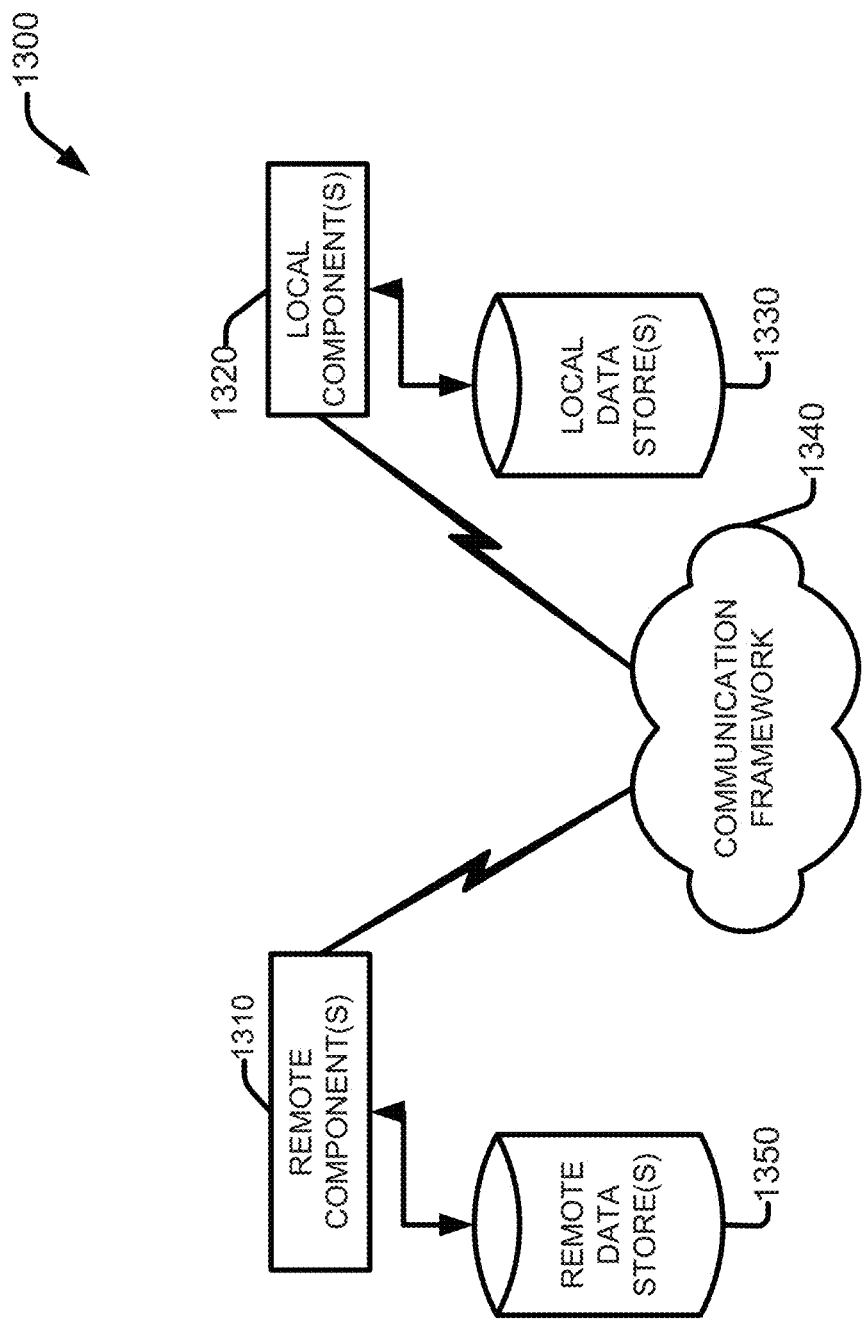
FIG. 13 depicts an example schematic block diagram of a computing environment with which the disclosed subject matter can interact.

FIG. 13 is a schematic block diagram of a computing environment 1300 with which the disclosed subject matter can interact. The system 1300 comprises one or more remote component(s) 1310. The remote component(s) 1310 can be hardware and/or software (e.g., threads, processes, computing devices). In some embodiments, remote component(s) 1310 can comprise servers, personal servers, wireless telecommunication network devices, RAN device(s), etc. As an example, remote component(s) 1310 can be network node 104, one or more devices included in the communication service provider networks 106, and the like. The system 1300 also comprises one or more local component(s) 1320. The local component(s) 1320 can be hardware and/or software (e.g., threads, processes, computing devices). In some embodiments, local component(s) 1320 can comprise, for example, a UE 102, one or more components of the UE 102, and the like etc.

One possible communication between a remote component(s) 1310 and a local component(s) 1320 can be in the form of a data packet adapted to be transmitted between two or more computer processes. Another possible communication between a remote component(s) 1310 and a local component(s) 1320 can be in the form of circuit-switched data adapted to be transmitted between two or more computer processes in radio time slots. The system 1300 comprises a communication framework 1340 that can be employed to facilitate communications between the remote component(s) 1310 and the local component(s) 1320, and can comprise an air interface, e.g., Uu interface of a UMTS network, via an LTE network, etc. Remote component(s) 1310 can be operably connected to one or more remote data store(s) 1350, such as a hard drive, solid state drive, SIM card, device memory, etc., that can be employed to store information on the remote component(s) 1310 side of communication framework 1340. Similarly, local component(s) 1320 can be operably connected to one or more local data store(s) 1330, that can be employed to store information on the local component(s) 1320 side of communication framework 1340.

Figure 14:
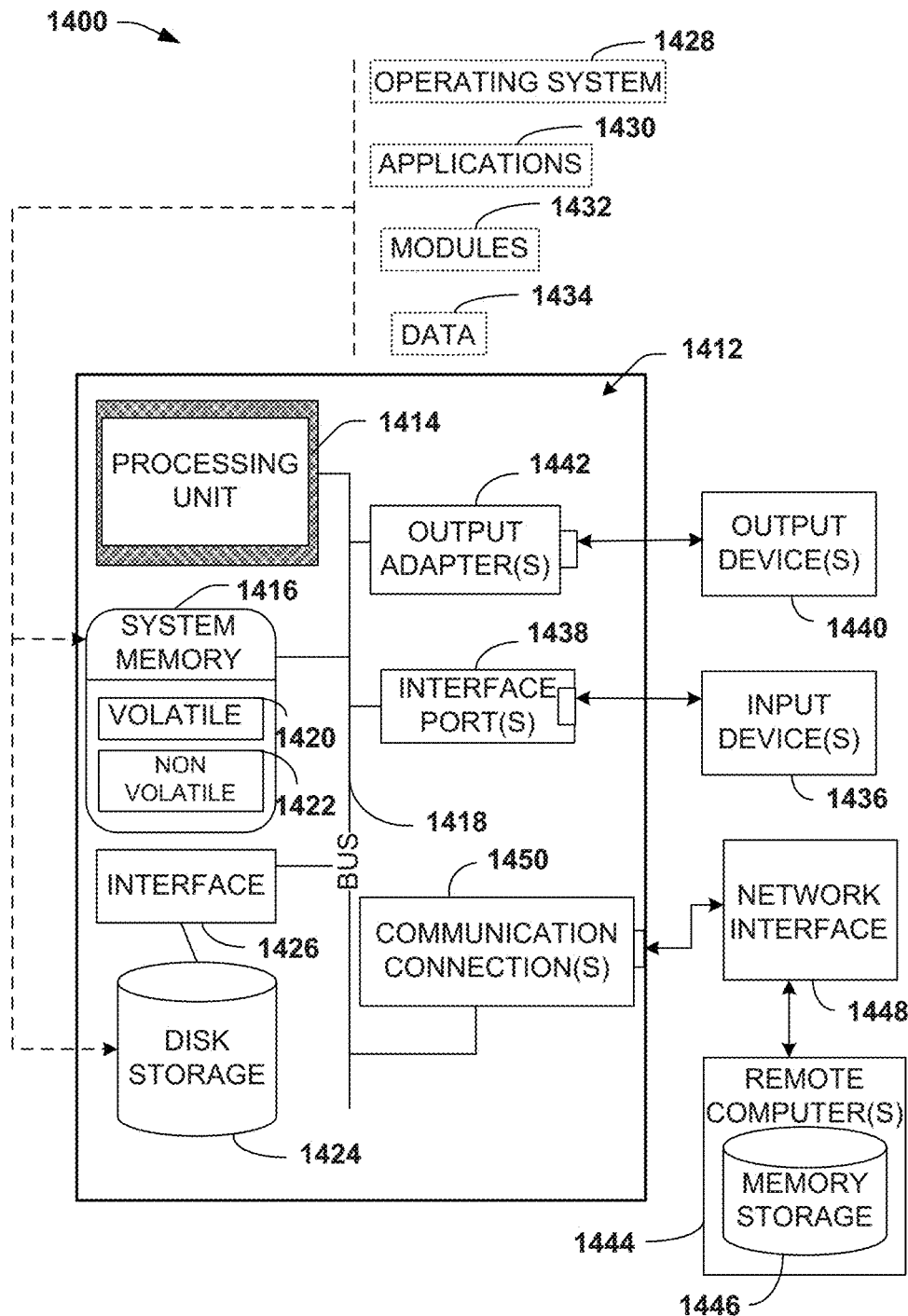
FIG. 14 illustrates an example block diagram of a computing system operable to execute the disclosed systems and methods in accordance with an embodiment.

In order to provide a context for the various aspects of the disclosed subject matter, FIG. 14, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," "data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1420 (see below), nonvolatile memory 1422 (see below), disk storage 1424 (see below), and memory storage 1446 (see below). Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, Synchlink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, notebook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 14 illustrates a block diagram of a computing system 1400 operable to execute the disclosed systems and methods in accordance with an embodiment. Computer 1412, which can be, for example, a UE (e.g., UE 102), a network node (e.g., network node 104), or the like, can comprise a processing unit 1414, a system memory 1416, and a system bus 1418. System bus 1418 couples system components comprising, but not limited to, system memory 1416 to processing unit 1414. Processing unit 1414 can be any of various available processors. Dual microprocessors and other multiprocessor architectures also can be employed as processing unit 1414.

System bus 1418 can be any of several types of bus structure(s) comprising a memory bus or a memory controller, a peripheral bus or an external bus, and/or a local bus using any variety of available bus architectures comprising, but not limited to, industrial standard architecture, microchannel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 14164), and small computer systems interface.

System memory 1416 can comprise volatile memory 1420 and nonvolatile memory 1422. A basic input/output system, containing routines to transfer information between elements within computer 1412, such as during start-up, can be stored in nonvolatile memory 1422. By way of illustration, and not limitation, nonvolatile memory 1422 can comprise read only memory, programmable read only memory, electrically programmable read only memory, electrically erasable read only memory, or flash memory. Volatile memory 1420 comprises read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, Synchlink dynamic read only memory, Rambus direct read only memory, direct Rambus dynamic read only memory, and Rambus dynamic read only memory.

Computer 1412 can also comprise removable/non-removable, volatile/non-volatile computer storage media. FIG. 14 illustrates, for example, disk storage 1424. Disk storage 1424 comprises, but is not limited to, devices like a magnetic disk drive, floppy disk drive, tape drive, flash memory card, or memory stick. In addition, disk storage 1424 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage devices 1424 to system bus 1418, a removable or non-removable interface is typically used, such as interface 1426.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can comprise non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium. As such, for example, a computer-readable medium can comprise executable instructions stored thereon that, in response to execution, cause a system comprising a processor to perform operations, comprising generating an RRC connection release message further comprising alternative band channel data.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 14 describes software that acts as an intermediary between users and computer resources described in suitable operating environment 1400. Such software comprises an operating system 1428. Operating system 1428, which can be stored on disk storage 1424, acts to control and allocate resources of computer system 1412. System applications 1430 take advantage of the management of resources by operating system 1428 through program modules 1432 and program data 1434 stored either in system memory 1416 or on disk storage 1424. It is to be noted that the disclosed subject matter can be implemented with various operating systems or combinations of operating systems.

A user can enter commands or information into computer 1412 through input device(s) 1436. In some embodiments, a user interface can allow entry of user preference information, etc., and can be embodied in a touch sensitive display panel, a mouse/pointer input to a graphical user interface (GUI), a command line controlled interface, etc., allowing a user to interact with computer 1412. Input devices 1436 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1414 through system bus 1418 by way of interface port(s) 1438. Interface port(s) 1438 comprise, for example, a serial port, a parallel port, a game port, a universal serial bus, an infrared port, a Bluetooth port, an IP port, or a logical port associated with a wireless service, etc. Output device(s) 1440 use some of the same type of ports as input device(s) 1436.

Thus, for example, a universal serial busport can be used to provide input to computer 1412 and to output information from computer 1412 to an output device 1440. Output adapter 1442 is provided to illustrate that there are some output devices 1440 like monitors, speakers, and printers, among other output devices 1440, which use special adapters. Output adapters 1442 comprise, by way of illustration and not limitation, video and sound cards that provide means of connection between output device 1440 and system bus 1418. It should be noted that other devices and/or systems of devices provide both input and output capabilities such as remote computer(s) 1444.

Computer 1412 can operate in a networked environment using logical connections to one or more remote computers, such as remote computer(s) 1444. Remote computer(s) 1444 can be a personal computer, a server, a router, a network PC, cloud storage, a cloud service, code executing in a cloud-computing environment, a workstation, a microprocessor based appliance, a peer device, or other common network node and the like, and typically comprises many or all of the elements described relative to computer 1412. A cloud computing environment, the cloud, or other similar terms can refer to computing that can share processing resources and data to one or more computer and/or other device(s) on an as needed basis to enable access to a shared pool of configurable computing resources that can be provisioned and released readily. Cloud computing and storage solutions can storing and/or processing data in third-party data centers which can leverage an economy of scale and can view accessing computing resources via a cloud service in a manner similar to a subscribing to an electric utility to access electrical energy, a telephone utility to access telephonic services, etc.

For purposes of brevity, only a memory storage device 1446 is illustrated with remote computer(s) 1444. Remote computer(s) 1444 is logically connected to computer 1412 through a network interface 1438 and then physically connected by way of communication connection 1450. Network interface 1448 encompasses wire and/or wireless communication networks such as local area networks and wide area networks. Local area network technologies comprise fiber distributed data interface, copper distributed data interface, Ethernet, Token Ring and the like. Wide area network technologies comprise, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1450 refer(s) to hardware/software employed to connect network interface 1448 to bus 1418. While communication connection 1450 is shown for illustrative clarity inside computer 1412, it can also be external to computer 1412. The hardware/software for connection to network interface 1448 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Further, the term "include" is intended to be employed as an open or inclusive term, rather than a closed or exclusive term. The term "include" can be substituted with the term "comprising" and is to be treated with similar scope, unless otherwise explicitly used otherwise. As an example, "a basket of fruit including an apple" is to be treated with the same breadth of scope as, "a basket of fruit comprising an apple."

Moreover, terms like "user equipment (UE)," "mobile station," "mobile," "subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "eNodeB," "home Node B," "home access point," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can comprise packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio access network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks comprise broadcast technologies (e.g., sub-Hertz, extremely low frequency, very low frequency, low frequency, medium frequency, high frequency, very high frequency, ultra-high frequency, super-high frequency, terahertz broadcasts, etc.); Ethernet; X.25; powerline-type networking, e.g., Powerline audio video Ethernet, etc.; femtocell technology; Wi-Fi; worldwide interoperability for microwave access; enhanced general packet radio service; third generation partnership project, long term evolution; third generation partnership project universal mobile telecommunications system; third generation partnership project 2, ultra mobile broadband; high speed packet access; high speed downlink packet access; high speed uplink packet access; enhanced data rates for global system for mobile communication evolution radio access network; universal mobile telecommunications system terrestrial radio access network; or long term evolution advanced.

The term "infer" or "inference" can generally refer to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference, for example, can be employed to identify a specific context or action, or can generate a probability distribution over states of interest based on a consideration of data and events. Inference can also refer to techniques employed for composing higher-level events from a set of events and/or data. Such inference results in the construction of new events or actions from a set of observed events and/or stored event data, whether the events, in some instances, can be correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A device, comprising:
 a processor; and
 a memory that stores executable instructions that, when executed by the processor, facilitate performance of operations, comprising:
  receiving, from a network device of a wireless communication network, activation information indicating that a phase tracking reference signal protocol has been activated for wireless communication between the device and the network device;
  determining a resource density of resource elements of the wireless communication network allocated for the phase tracking reference signal protocol;
  determining channel state information based on the resource density; and
  sending the channel state information to the network device.

2. The device of claim 1, wherein, based on reception of the channel state information, the network device is to employ the channel state information to determine a downlink communication scheduling parameter for a downlink transmission of the wireless communication.

3. The device of claim 1, wherein the determining the resource density comprises applying predefined configuration information for the phase tracking reference signal protocol that sets the resource density to a defined time density value and a defined frequency density value.

4. The device of claim 3, wherein the defined time density value and the defined frequency density value are respectively set to zero and reflect an assumption that no resource elements are used for the phase tracking reference signal protocol.

5. The device of claim 3, wherein the defined time density value comprises 2.0 $L_{PT\text{-}RS}$ and wherein the defined frequency density value comprises 5.0 $K_{PT\text{-}RS}$.

6. The device of claim 3, wherein the operations further comprise:
 employing the defined time density value and the defined frequency density value in association with determining updated channel state information after the sending.

7. The device of claim 3, wherein the operations further comprise, in response to the sending:
 receiving downlink control information from the network device in association with a downlink traffic data transmission received from the network device;
 determining an updated resource density of the resource elements of the wireless communication network allocated for the phase tracking reference signal protocol based on the downlink control information;
 determining updated channel state information based on the updated resource density; and
 sending the updated channel state information to the network device.

8. The device of claim 7, wherein, based on reception of the updated channel state information, the network device is to employ the updated channel state information to determine a downlink communication scheduling parameter for a downlink transmission of the wireless communication.

9. The device of claim 1, wherein the determining the resource density comprises determining the resource density based on previously received downlink control information received from the network device.

10. The device of claim 1, wherein the determining the resource density comprises determining the resource density based on previously received modulation and coding scheme information received from the network device, and wherein the previously received modulation and coding scheme information identifies a scheduled modulation coding scheme for the wireless communication.

11. The device of claim 1, wherein the determining channel state information comprises determining a rank indicator, a precoding matrix indicator, and a channel quality indicator.

12. The device of claim 1, wherein the operations further comprise:
 providing resource density information identifying the resource density to the network device in association with the sending the channel state information.

13. A method, comprising:
 sending, by a network device of a wireless communication network, activation information to a device indicating that a phase tracking reference signal protocol has been activated for wireless communication between the device and the network device;
 based on the sending, receiving, by the network device, channels state information for a communication channel between the network device and the device to be used for the wireless communication, wherein the channel state information was determined based on a default phase tracking reference signal density of resource elements of the wireless communication network allocated for phase tracking reference signals of the phase tracking reference signal protocol.

14. The method of claim 13, further comprising:
employing, by the network device, the channel state information to determine a downlink communication scheduling parameter for a downlink transmission of the wireless communication.

15. The method of claim 14, further comprising:
determining, by the network device, an actual phase tracking reference signal density of the resource elements to allocate for the phase tracking reference signals;
configuring, by the network device, the downlink data transmission in accordance with the downlink communication scheduling parameter and the actual phase tracking reference signal density; and
sending, by the network device, the downlink data transmission to the device.

16. The method of claim 15, further comprising:
sending, by the network device, downlink control information in association with the downlink data transmission, the downlink control information comprising information identifying the actual phase tracking reference signal density.

17. The method of claim 16, wherein based on the sending, the device recalculates the channel state information based on the actual phase tracking reference signal density, resulting in updated channel state information, and wherein the method further comprises:
receiving, by the network device, the update channel state information from the device.

18. A non-transitory machine-readable medium, comprising executable instructions that, when executed by a processor of a device, facilitate performance of operations, comprising:
receiving from a network device of a wireless communication network, activation information indicating that a phase tracking reference signal protocol has been activated for a wireless communication between the device and the network device;
based on the receiving, determining channel state information based on a defined resource density, wherein the defined resource density represents an amount of resource elements of the wireless communication network allocated for the phase tracking reference signal protocol in a time domain and a frequency domain; and
sending the channel state information to the network device.

19. The non-transitory machine-readable medium of claim 18, wherein the sending the channel state information comprises sending the channel state information to the network device to enable the network device to employ the channel state information to determine a downlink communication scheduling parameter for a downlink transmission of the wireless communication.

20. The non-transitory machine-readable medium of claim 19, wherein the determining channel state information comprises determining a rank indicator, a precoding matrix indicator, and a channel quality indicator.

* * * * *